United States Patent
Iwasaki

(10) Patent No.: US 11,388,091 B2
(45) Date of Patent: Jul. 12, 2022

(54) SMALL FORM FACTOR PLUGGABLE UNIT WITH WIRELESS CAPABILITIES AND METHODS, SYSTEMS AND DEVICES UTILIZING SAME

(71) Applicant: Sean Iwasaki, Chicago, IL (US)

(72) Inventor: Sean Iwasaki, Chicago, IL (US)

(*) Notice: Subject to any disclaimer, the term of this patent is extended or adjusted under 35 U.S.C. 154(b) by 0 days.

(21) Appl. No.: 17/232,600

(22) Filed: Apr. 16, 2021

(65) Prior Publication Data

US 2021/0306263 A1    Sep. 30, 2021

Related U.S. Application Data

(63) Continuation-in-part of application No. 16/917,475, filed on Jun. 30, 2020, which is a continuation-in-part of application No. 16/839,260, filed on Apr. 3, 2020, and a continuation-in-part of application No. 16/415,899, filed on May 17, 2019, now Pat. No. 10,985,440, which is a continuation of application No. 15/294,858, filed on Oct. 17, 2016, now Pat. No. 10,446,909, said application No. 16/839,260 is a continuation of application No. 15/687,862, filed on Aug. 28, 2017, now Pat. No. 10,637,776.

(60) Provisional application No. 62/381,168, filed on Aug. 30, 2016, provisional application No. 62/243,957, filed on Oct. 20, 2015.

(51) Int. Cl.
| | |
|---|---|
| *H04L 45/60* | (2022.01) |
| *H04L 49/109* | (2022.01) |
| *H04L 49/00* | (2022.01) |
| *H04L 49/35* | (2022.01) |

(52) U.S. Cl.
CPC ............ *H04L 45/60* (2013.01); *H04L 49/109* (2013.01); *H04L 49/30* (2013.01); *H04L 49/355* (2013.01)

(58) Field of Classification Search
CPC ....... H04L 45/60; H04L 49/109; H04L 49/30; H04L 49/355
See application file for complete search history.

(56) References Cited

U.S. PATENT DOCUMENTS

| | | | | |
|---|---|---|---|---|
| 10,650,621 | B1* | 5/2020 | King | H04L 67/12 |
| 2007/0229366 | A1* | 10/2007 | Kim | H01Q 9/42 |
| | | | | 343/846 |
| 2012/0275319 | A1* | 11/2012 | Peiris | H04W 52/367 |
| | | | | 370/339 |
| 2016/0270032 | A1* | 9/2016 | Guevin | H04W 16/10 |
| 2017/0070918 | A1* | 3/2017 | Zhou | H04W 36/0022 |
| 2017/0097842 | A1* | 4/2017 | Bugenhagen | G06F 13/102 |
| 2017/0110782 | A1* | 4/2017 | Iwasaki | H01Q 1/38 |
| 2021/0306263 | A1* | 9/2021 | Iwasaki | H04L 49/355 |

* cited by examiner

*Primary Examiner* — Harry H Kim
(74) *Attorney, Agent, or Firm* — Charles T. Riggs, Jr.

(57) ABSTRACT

The present subject matter relates to one or more devices, systems and/or methods for providing wireless telecommunication services. A Small Form Factor Pluggable Unit (SFP) incorporates wireless capabilities, and includes an integrated or an external antenna. The SFP comprises wireless circuitry for transmitting and receive multiple and distinct wireless signals, including Wi-Fi and Bluetooth for communicating with various equipment, devices and/or networks.

21 Claims, 19 Drawing Sheets

| COLOR | CADENCE | DESCRIPTION |
|---|---|---|
| GREEN | STEADY | WI-FI "LINKED" & BLUETOOTH "IDLE" |
| GREEN | BLINKING | WI-FI "ACTIVITY" & BLUETOOTH "IDLE" |
| BLUE | STEADY | WI-FI "IDLE" & BLUETOOTH "LINKED" |
| BLUE | BLINKING | WI-FI "IDLE" & BLUETOOTH "ACTIVITY" |
| GREEN BLUE | ALT BLINK 1 SEC | WI-FI & BLUETOOTH "LINKED" |
| AMBER | STEADY | SFP STATUS: "ON" & "WIRELESS DISABLED" |
| AMBER | BLINKING | SFP STATUS: "ON" & "TEST/UPGRADING" |
| NONE | NONE | SFP STATUS: "NO POWER - NOT WORKING" |

FIGURE 14

SMALL FORM FACTOR PLUGGABLE UNIT WITH WIRELESS CAPABILITIES AND METHODS, SYSTEMS AND DEVICES UTILIZING SAME

RELATED APPLICATIONS

This application is a continuation-in-part of U.S. application Ser. No. 16/917,475 entitled Circuitry for Demarcation Devices and Methods Utilizing Same, file Jun. 30, 2020, which is a continuation-in-part of:

U.S. application Ser. No. 16/839,260 entitled Multi-functional Circuitry for Communications Networks and Methods and Devices Utilizing Same, filed Apr. 3, 2020, which is a continuation of U.S. application Ser. No. 15/687,862 entitled Multi-functional Circuitry for Communications Networks and Methods and Devices Utilizing Same, filed Aug. 28, 2017, now U.S. Pat. No. 10,637,776 issued Apr. 28, 2020, and which claims priority to U.S. Provisional Application Ser. No. 62/381,168 filed Aug. 30, 2016; and U.S. application Ser. No. 16/415,899 entitled Small Form Factor Pluggable Unit with Wireless Capabilities, filed May 17, 2019, which is a continuation of U.S. application Ser. No. 15/294,858 entitled Small Form Factor Pluggable Unit with Wireless Capabilities, filed Oct. 17, 2016, now U.S. Pat. No. 10,446,909 issued on Oct. 15, 2019, and which claims priority to Provisional Application Ser. No. 62/243,957 filed Oct. 20, 2015; the entire disclosures of which are herein incorporated by reference.

TECHNICAL FIELD

The exemplary teachings herein pertain to telecommunications equipment, methods and systems. Specifically, the present disclosure relates to methods and systems incorporating Small Form-factor Pluggable (SFP) devices used to provide communication services for the communication market.

BACKGROUND

Small form factor pluggable units such as disclosed in U.S. Pat. No. 8,761,604 issued to Lavoie et al. on Jun. 24, 2014, herein fully incorporated by reference, are known in the art. As described in Column 1, lines 10-48 in the '604 patent:

Small Form-factor Pluggable (SFP) devices are standardized, hot-pluggable devices used to provide communication services for the communication market. The SFF (Small Form Factor) Committee defines the mechanical, electrical, and software specifications of the SFP device to ensure interoperability among SFP devices and chassis. SFF Committee document INF-8074i Rev 1.0 provides specifications for SFP (Small Formfactor Pluggable) Transceiver. SFF Committee documents SFF-8431 Rev 4.1 SFP+ 10 Gb/s and Low Speed Electrical Interface provides specifications for SFP+ devices. SFF Committee document INF-8438i Rev 1.0 provides specifications for QSFP (Quad Small Formfactor Pluggable) Transceiver. SFF Committee document INF-8077i Rev 4.5 (10 Gigabit Small Form Factor Pluggable Module) provides specifications for XFP devices. These documents represent the various families of SFP devices available.

SFP devices are designed to be inserted within a cage, which the cage is attached to the communication equipment circuit assembly. SFF Committee document SFF-8432 Rev 5.1 SFP+ provides specifications for the SFP+ module and cage. Ethernet switches, Ethernet routers, servers are examples of equipment using SFP type devices. SFP devices are available with different exterior connectors for various applications. SFP devices are available with coaxial connectors, SC/LC optical connectors, and RJ modular jack types connectors.

SFF Committee document SFF-8472 Diagnostic Monitoring Interface for Optical Transceivers provides specifications on the SFP device's identity, status, and real-time operating conditions. SFF-8472 describes a register and memory map which provides alarms, warnings, vendor identity, SFP description and type, SFP real time diagnostic, and vendor specific registers. This information is to be used by the SFP host equipment.

Other references relating to and/or discuss technology related to small form factor units or devices include U.S. Pat. No. 8,036,539 issued to Kiely et al. on Oct. 11, 2011 and U.S. Patent Application Publication No. 2006/0209886 issued to Silberman et al. on Sep. 21, 2006. Each of these references is herein fully incorporated by reference.

By way of further background, small form factor pluggable (SFP) devices are used to provide a flexible means of providing communication services for the telecommunication network. The SFP devices are typically deployed on communication network equipment such as an Ethernet access switch, Ethernet router, a broadband fiber multiplexer, or media converters. SFP devices are designed to support optical and wired Ethernet, TDM SONET, Fiber Channel, and other communications standards. Due to its small and portable physical size, SFP devices have expanded in specifications to address other applications. SFP devices presently are defined for XFP, SFP, SFP+, QSFP, QLSFP, QSFP+, and CXP technologies. SFP devices are standardized among equipment vendors and network operators to support interoperability. Due to the low cost, size, and interoperability, SFP devices are used extensively in all communication service applications.

802.11 is a set of media access control (MAC) and physical layer (PHY) specifications for implementing wireless local area network (WLAN) computer communication in the 2.4, 3.6, 5, and 60 GHz frequency bands. They are created and maintained by the IEEE LAN/MAN Standards Committee (IEEE 802). The base version of the standard was released in 1997, and has had subsequent amendments. The standard and amendments provide the basis for wireless network products using the Wi-Fi brand. While each amendment is officially revoked when it is incorporated in the latest version of the standard, the corporate world tends to market to the revisions because they concisely denote capabilities of their products. As a result, in the market place, each revision tends to become its own standard.

The 802.11 family consists of a series of half-duplex over-the-air modulation techniques that use the same basic protocol. 802.11-1997 was the first wireless networking standard in the family, but 802.11b was the first widely accepted one, followed by 802.11a, 802.11g, 802.11n, and 802.11ac. Other standards in the family (c-f, h, j) are service amendments and extensions or corrections to the previous specifications.

802.11b and 802.11g use the 2.4 GHz ISM band, operating in the United States under Part 15 of the U.S. Federal Communications Commission Rules and Regulations. Because of this choice of frequency band, 802.11 b and g equipment may occasionally suffer interference from microwave ovens, cordless telephones, and Bluetooth devices. 802.11b and 802.11g control their interference and susceptibility to interference by using direct sequence spread spectrum (DSSS) and orthogonal frequency division multiplexing (OFDM) signaling methods, respectively. 802.11a uses the 5 GHz U-NII band, which, for much of the world, offers at least 23 non-overlapping channels rather than the 2.4 GHz ISM frequency band, where adjacent channels overlap—e.g., WLAN channels. Better or worse performance with higher or lower frequencies (channels) may be realized, depending on the environment.

The segment of the radio frequency spectrum used by 802.11 varies between countries. In the US, 802.11a and 802.11g devices may be operated without a license, as allowed in Part 15 of the FCC Rules and Regulations. Frequencies used by channels one through six of 802.11b and 802.11g fall within the 2.4 GHz amateur radio band. Licensed amateur radio operators may operate 802.11b/g devices under Part 97 of the FCC Rules and Regulations, allowing increased power output but not commercial content or encryption.

Bluetooth is a wireless technology using short-wavelength UHF radio waves in the ISM band from 2.4 to 2.485 GHz from fixed and mobile devices, and in-building networks. Invented by telecom vendor Ericsson in 1994, it was originally conceived as a wireless alternative to RS-232 data cables. It can connect several devices, overcoming problems of synchronization. Bluetooth is managed and oversees the development of the specification and manages the qualification program. Bluetooth technology is a global wireless communication standard that is present on a majority of mobile devices.

ZigBee is an IEEE 802.15.4-based specification for a suite of high-level communication protocols used to create personal area networks with small, low-power digital radios. Its low power consumption limits transmission distances to 10-100 meters line-of-sight, depending on power output and environmental characteristics. ZigBee is typically used in low data rate applications that require long battery life and secure networking. ZigBee has a defined rate of 250 kbit/s, best suited for intermittent data transmissions from a sensor or input device.

Wi-Fi has become a very ubiquitous, cost effective, and popular wireless network technology. Service and Network Providers are increasing their Wi-Fi services as a cost effective technology to provide wireless services. These Providers typically deploy Wi-Fi services using a wireless router and an Ethernet Access Switch or Network Interface Device (NID). The Ethernet Access Switch or NID provides data transport to and from the telecommunication network. The wireless router provides the media conversion and protocol processing of the data received from the Ethernet Access Switch or NID. The Ethernet Access Switch or Network Interface Device will typically have one or more SFP ports. The SFP port will be populated with an SFP device, which the SFP device will connect to the wireless router with a cable, as illustrated in prior art FIG. 1.

Communication equipment will typically use a secondary technology to provide information on device status, identity, and configuration to other devices. This secondary technology can also be used to provision or configure the device or communicate information to other remote devices or systems. This secondary technology is typically a wired technology and requires the use of a cable. The device will have a DB9 connector or RJ45 modular jack if RS232 is the communication protocol, as shown in prior art FIG. 3A. The device can also use an RJ45 modular jack if Ethernet is the communication protocol, as shown in FIG. 3B. The disadvantage of using wired technology for secondary communication is the added cost of the cable and the requirement to have a cable of proper length, wiring, and matching physical connectors. The cable also restricts the mobility of both the devices, where both devices must remain stationary to facility efficient communications.

Mobile devices such as smart phones, tablets, or wearable devices and Internet of Things (IoT) devices cannot support large physical connectors such as a DB9 connector or an RJ45 modular jack. In addition, communications with mobile and wearable devices should not restrict the mobility of these devices.

SFP devices are very popular due to the low cost, standardization, and interoperability. SFP devices have endured many functional and mechanical changes. Since the initial development of the SFP in 2000, there have been many SFP improvements in functionality and mechanical form factor, such as XFP, X2, SFP, SFP+, QSFP, QSFP+, and CXP technologies. Presently, SFP support optical, wire, or coax services, such as Ethernet, SONET, Fiber Channel, DS3, DS1, video, etc. SFPs supporting optical fiber service use an LC or SC connector. SFPs supporting wired Ethernet or DS1 services use an RJ45 modular connector. SFPs supporting wired DS3 or video services use a coax connector.

SUMMARY

Generally, the SFP of the present disclosure comprises a small pluggable housing, a printed circuit board (PCB) located in the housing, and wireless circuitry. The small form factor pluggable unit, device or module of the present disclosure is provided with wireless capabilities, allowing for the provision of a versatile, cost effective and improved reliability of wireless communication services in a standard SFP. The small size and industry standard small pluggable form factor provides the framework for device interoperability, lower part costs, manufacturing, and supply chain optimization. Other wireless products are larger, have propriety or less popular form factor.

The wireless SFP of the present invention functions as a wireless Access Point (AP) or Station (STA). As a wireless AP (WAP), the present invention can be deployed as a cost-effective method to offload data traffic from cellular networks. As a wireless Station (STA), the present invention can be deployed as a cost-effective client or Internet of Things (IoT) solution for communication equipment supporting SFP devices. The recent advances in Wi-Fi technology augment the deployment of the cellular networks using cost-efficient wireless access points in unlicensed spectrum. The wireless SFP can be used in new and existing equipment which can house SFP devices.

The wireless SFP of the present invention also functions as a wireless Repeater. As a wireless Repeater, the present invention can be deployed as a cost-effective method to establish or extend wireless services from a weak wireless signal.

The wireless SFP of the present invention also functions as a wireless Bridge. As a wireless Bridge, the present invention can be deployed to link two networks.

The wireless SFP of the present invention provides performance monitoring and testing using applicable sections of IEEE 802.1ag, ITU Y.1731, ITU Y.1564, MEF30, MEF36, ITU Y.1564 and other similar standards or specifications. The wireless SFP of the present disclosure is also provided with remote testing capabilities, allowing for the provision of testing of wireless services through remote testing. Existing wireless products are not designed to have remote loopback testing capabilities and provide remote performance monitoring capabilities. Typical wireless routers or wireless access points are designed to be tested locally, requiring a person to be at the wireless router. Testing typically involves the measuring the wireless signal strength or the ability to poll or communicate to the wireless device. The wireless SFP of the present invention includes the ability to also perform intrusive loopback testing to verify the wireless service. These Remote testing and performance monitoring capabilities will allow the Service Providers to address the maintenance and troubleshooting of wireless services remotely, i.e., without local presence. The ability to provide performance monitoring and testing will increase the reliability and quality of the service of the wireless SFP.

The wireless SFP of the present invention is also provided with additional wireless communication channels or signals. The additional wireless communication channels or signals are used to communicate data to other devices, such as mobile devices, Internet of Things (IoT) devices, wearable devices, and other wireless SFP devices. Devices will communicate any of the following data: identity, position, status, events, and control. The additional wireless communication channels or signals can be Bluetooth, Zigbee, or any other wireless technology. Bluetooth is a wireless technology standard for exchanging data over short distances using short-wavelength UHF radio waves in the ISM band from 2.4 to 2.485 GHz. Bluetooth is typically used as a secondary wireless communication method of mobile devices. The use of a secondary wireless technology allows time and location of the wireless SFP of the present invention. The mobile or IoT device will communicate information using Bluetooth or Zigbee to the wireless SFP. The wireless SFP will be installed at the customer's building or premises at unpredictable locations. Wi-Fi and Bluetooth triangulation using the wireless technology incorporated into the wireless SFP of the present invention allows for the provision of location and tracking of the SFP, such that it is readily available or accessible during wireless service outage or maintenance.

The wireless SFP of the present disclosure is also provided with an internal antenna or with a port or connector for connecting an external antenna, to improve wireless service performance or SFP installation. The improvement in wireless service with an internal antenna is accomplished with positioning the SFP among the many communication equipment small pluggable receptacles. The improvement in wireless service with an external antenna is accomplished with the positioning of the external antenna for optimal wireless signal transmission and reception.

Accordingly, the SFP of the present disclosure provides a cost effective method of providing wireless communications, by providing wireless communications capabilities in an industry standard small pluggable form factor. The SFP of the present disclosure will improve wireless service by optimizing wireless performance through communications with other wireless devices. The SFP of the present disclosure further improves wireless service by providing an internal antenna or allowing for the attachment of an external antenna.

The wireless SFP of the present disclosure will also facilitate indoor or outdoor positioning systems (IOPS). IOPS is a system to locate wireless devices inside a structure using information collected by mobile or IoT devices and triangulation. The present disclosure uses a secondary wireless technology to communicate information to other wireless mobile devices. The communication with other wireless SFP and wireless mobile devices will allow time, location, and tracking information to be shared with the IOPS system or other similar Wi-Fi positioning systems. Wi-Fi and Bluetooth triangulation for IOPS data can be achieved using three wireless SFPs in a facility.

The SFP of the present disclosure also provides capabilities for the performance monitoring and testing of the wireless communication device for improved wireless serviceability and diagnostics of the wireless communication device. Further, the SFP of the present disclosure improves wireless service maintenance by providing a secondary wireless channel or signal, allowing the SFP to be serviced quickly and easily.

Accordingly, it is an object of the present disclosure to provide a small, low cost, and simple method and device to provide and service wireless communications into an industry standard small pluggable form factor.

It is another objective of the present disclosure to provide a SFP method and device which can be geographically located.

It is still another objective of the present disclosure to provide a SFP method and device which can communicate to other wireless devices.

It is still another objective of the present disclosure to provide a SFP method and device which can provide wireless performance information for remote access.

It is still another objective of the present disclosure to provide a SFP method and device which can provide remote testing of the wireless service.

It is still another objective of the present disclosure to provide a SFP method and device which can optimize wireless performance and installation by providing a wireless antenna to be internally or externally attached.

It is still another objective of the present disclosure to provide a SFP method and device which provides a secondary wireless communication channel to communicate to other wireless devices.

It is still another objective of the present disclosure to have an LED communicate information to animate and inanimate objects.

Additional objectives, advantages and novel features will be set forth in part in the description which follows, and in part will become apparent to those skilled in the art upon examination of the following and the accompanying drawings or may be learned by production or operation of the examples.

BRIEF DESCRIPTION OF THE DRAWINGS

The drawing figures depict one or more implementations in accord with the present teachings, by way of example only, not by way of limitation. In the drawing figures, like reference numerals refer to the same or similar elements.

FIG. 14 is a table describing the functionality of the wireless SFP of the present disclosure using a light emitting diode (LED).

DETAILED DESCRIPTION

The following description refers to numerous specific details which are set forth by way of examples to provide a thorough understanding of the relevant method(s), system(s) and device(s) disclosed herein. It should be apparent to those skilled in the art that the present disclosure may be practiced without such details. In other instances, well known methods, procedures, components, hardware and/or circuitry have been described at a relatively high-level, without detail, in order to avoid unnecessarily obscuring aspects of the present disclosure. While the description refers by way of example to wireless SFP devices and methods and systems, it should be understood that the method(s), system(s) and device(s) described herein may be used in any situation where wireless telecommunication services are needed or desired.

Figure 1:
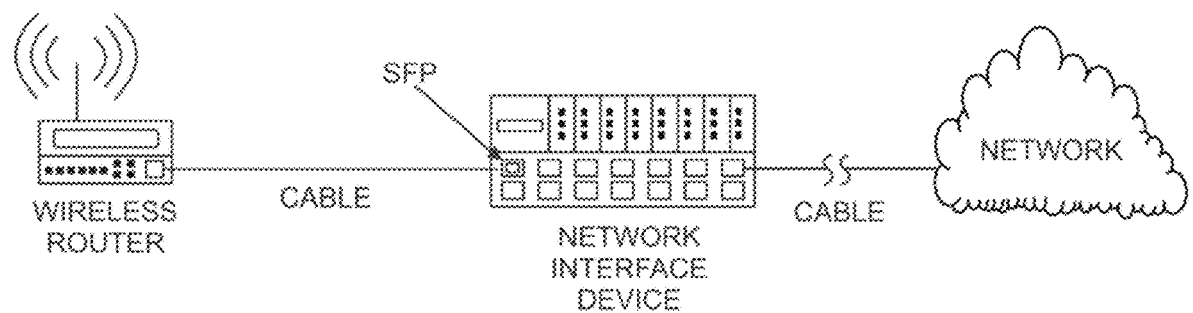
FIG. 1 is schematic diagram of a prior art telecommunication system for providing wireless service.
Figure 2:
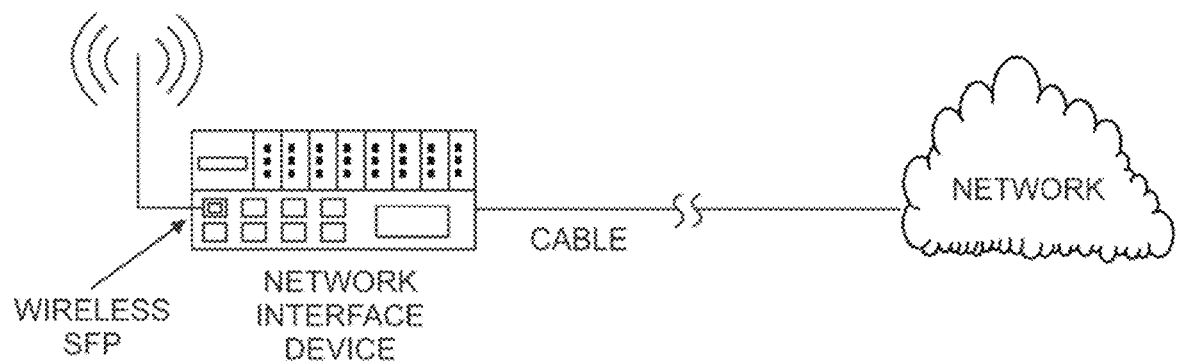
FIG. 2 is a schematic diagram of a telecommunication system for providing wireless service via the wireless SFP of the present disclosure.

As illustrated in FIG. 2, the wireless SFP device of the present disclosure replaces the Wi-Fi router, the SFP device in the NID, and the associated cabling and mounting hardware depicted in prior art FIG. 1. Due to the wireless SFP device conformance to applicable SFF specifications, the wireless SFP device can be installed and deployed by any equipment which supports SFP devices. In doing so, this allows any SFP supported equipment the added ability to provide wireless service. Further, the wireless SFP device of the present disclosure also simplifies the deployment and installation of wireless service by simply inserting the wireless SFP device into any equipment which supports SFP devices.

Figure 3A:
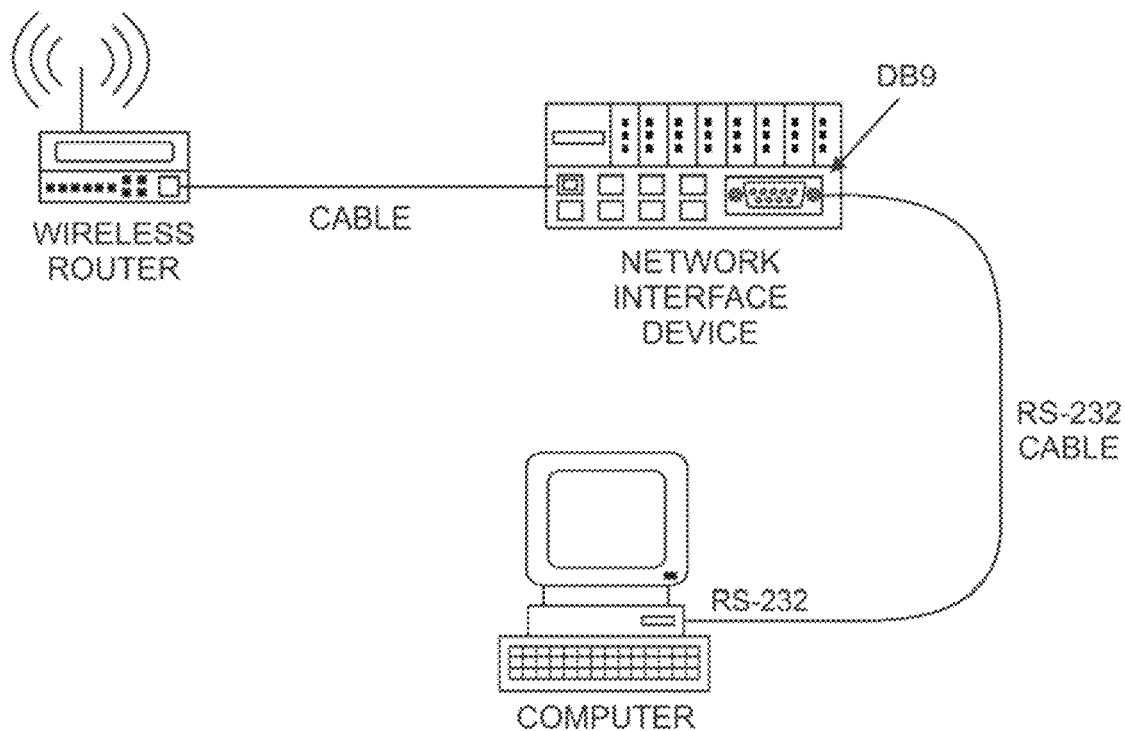
FIG. 3A is a schematic diagram of a prior art telecommunication system using cables and connectors to communicate with equipment.
Figure 3B:
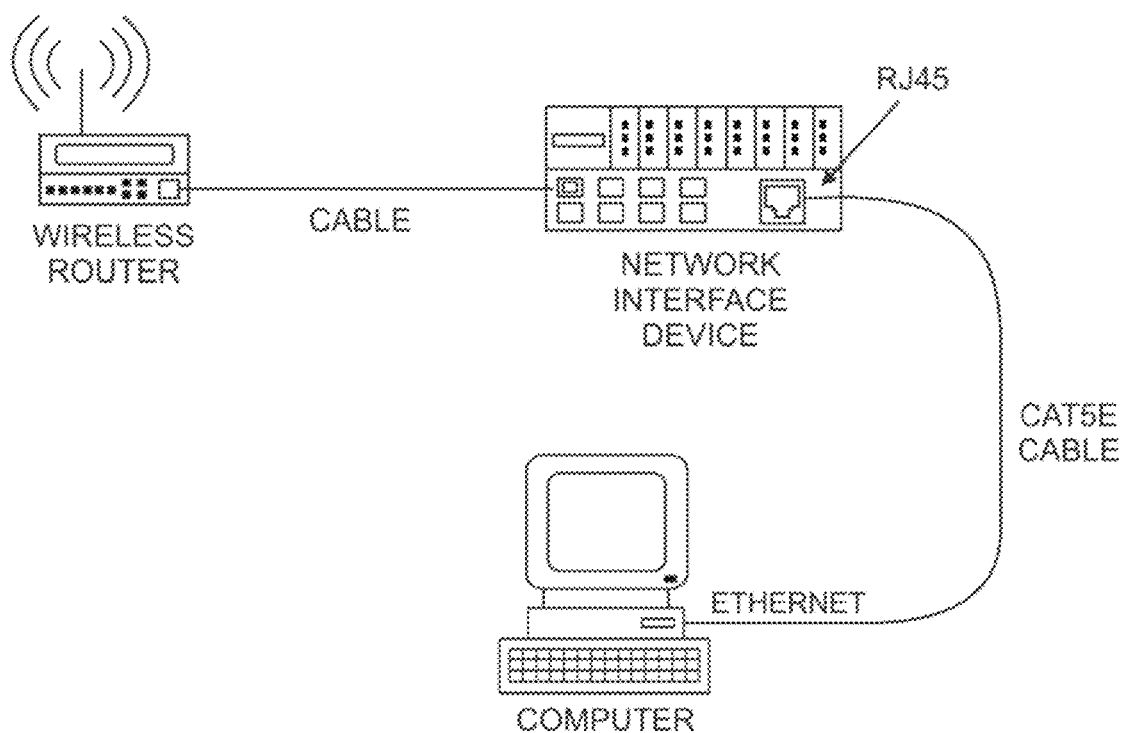
FIG. 3B is a schematic diagram of a prior art telecommunication system using alternate cables and connectors to communicate with equipment.
Figure 4:
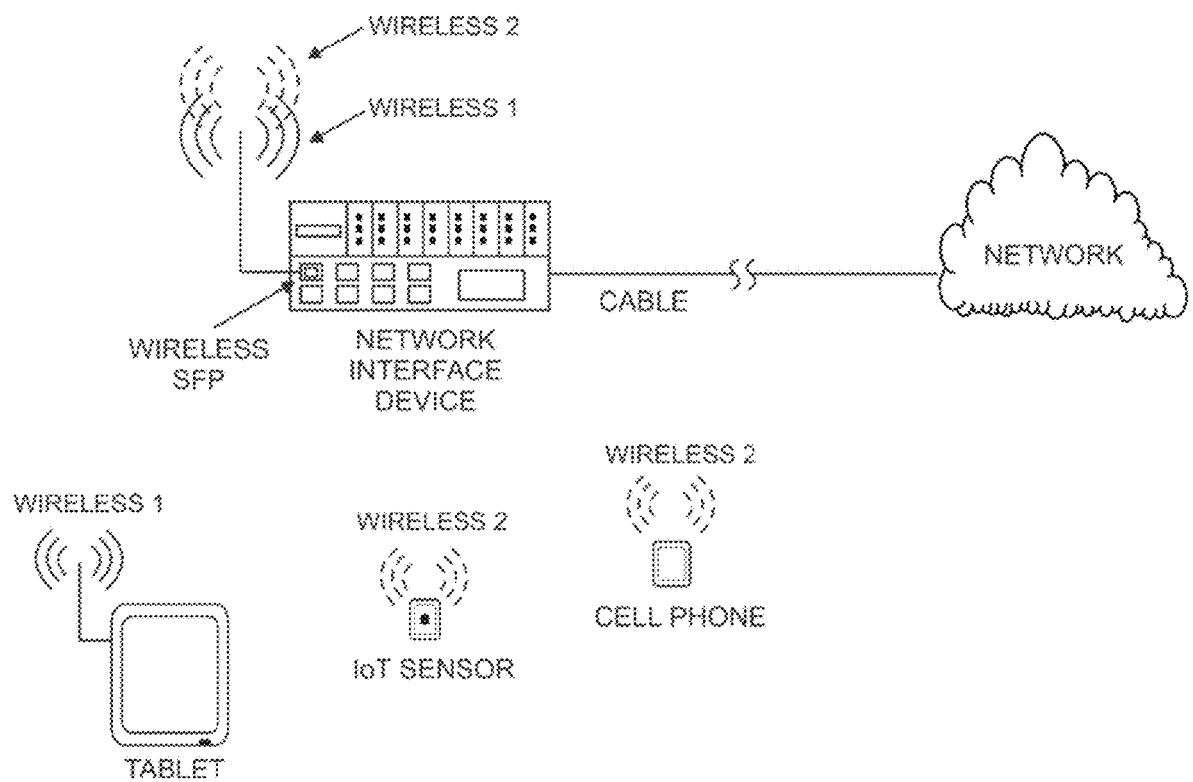
FIG. 4 is a schematic diagram of the telecommunication system of FIG. 2, illustrating the use of a secondary wireless technology to communicate with equipment.

Unlike the wired systems of prior art FIG. 3, a method and system of the present disclosure employs the use of a secondary wireless technology to communicate with equipment, as illustrated in FIG. 4. Accordingly, the wireless SFP of the present disclosure uses wireless as additional technologies to communicate with devices. This additional wireless technology will be different than the Wi-Fi wireless technology, which Wi-Fi used as the primary data transport for the network. There may be two or more wireless technologies used to communicate with other mobile and wearable devices.

Wi-Fi, Bluetooth, and Zigbee wireless technologies represent wireless technologies which one, two, or all these technologies will coexist. Bluetooth is a wireless technology standard for exchanging data over short distances using short-wavelength UHF radio waves in the ISM band from 2.4 to 2.485 GHz. Bluetooth is typically used as a secondary wireless communication method of mobile devices. The Wi-Fi and Bluetooth technologies incorporated into the wireless SFP of the present invention allows for the provision of location and tracking of the wireless SFP, such that it is readily available or accessible during wireless service outage or maintenance. The Wi-Fi and Bluetooth will also provide the infrastructure to manage and track mobile and wearable devices through indoor positioning systems.

The additional wireless technology may use a single antenna for coexistence of all wireless technologies, as shown in FIG. 4. The method and systems of the present disclosure will support multiple antennas to enhance the performance of the wireless technologies.

FIGS. 5A-9 illustrate a number of embodiments of the wireless SFP and associated antenna. The wireless SFP can support multiple wireless services, such as Wi-Fi, Bluetooth, Zigbee, and others. The associated antenna can be integrated in the wireless SFP device, or can be connected via a suitable connector.

Figure 5A:
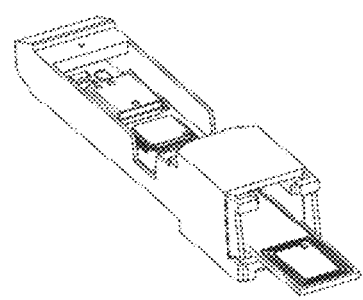
FIG. 5A is a top front perspective view of the wireless SFP of the present disclosure with an integrated antenna with the housing partially removed to illustrate internal components and internal PCB antenna.
Figure 5B:
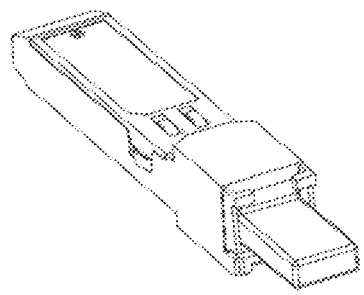
FIG. 5B is a top front perspective view of the wireless SFP of FIG. 5 with its housing.
Figure 5C:
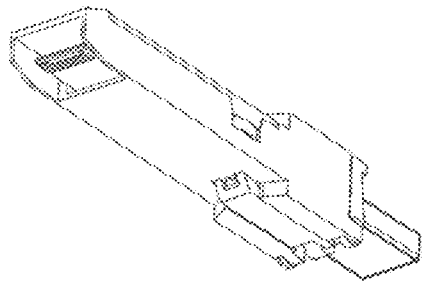
FIG. 5C is a bottom back perspective view of the wireless SFP of FIG. 5 with its housing.

For example, the antenna may be etched on a printed circuit board (PCB) internal of the SFP. FIGS. 5A-5C illustrate such an integrated, internal PCB antenna. In this embodiment, a connector for an external antenna is not needed and thus is eliminated.

Figure 6:
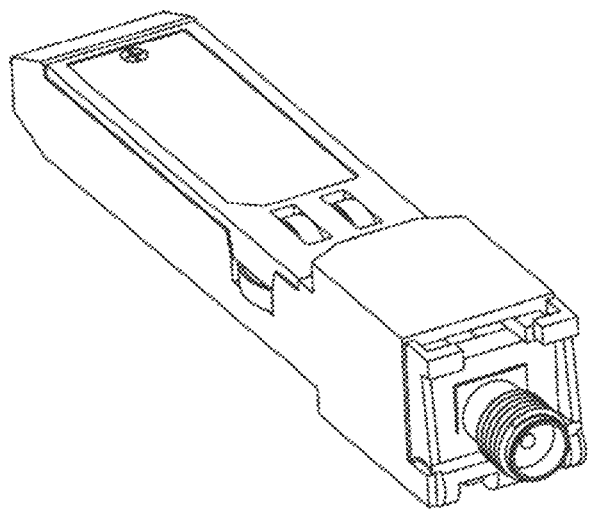
FIG. 6 is a perspective view of the wireless SFP of the present disclosure with a coaxial connector to attach an external antenna with a coaxial connector.
Figure 7:
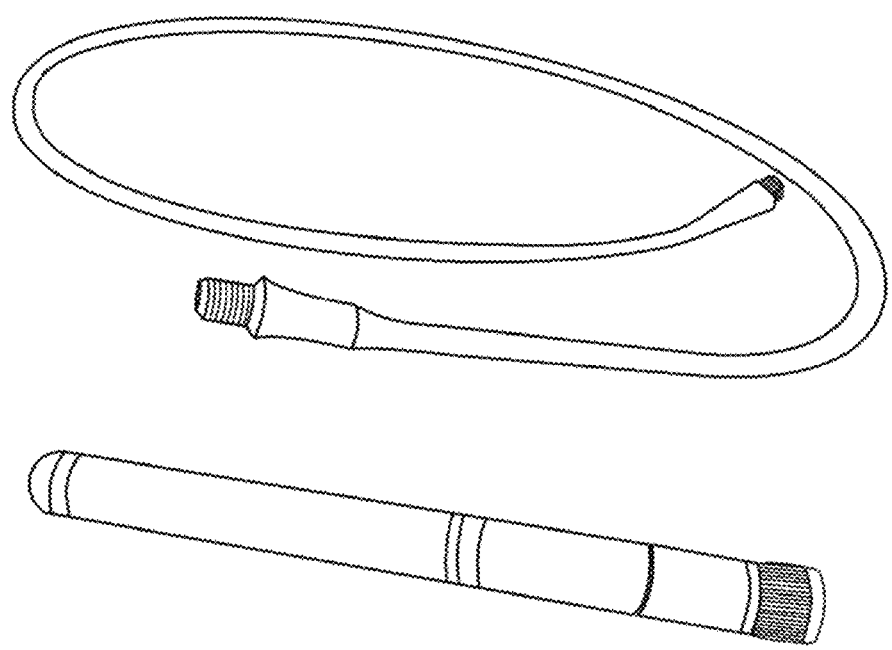
FIG. 7 is a perspective view of an external antenna with a coaxial connector and a coax cable attachment for use with the wireless SFP of FIG. 6.

In another embodiment, the wireless SFP includes a coax connector to support an external antenna. FIG. 6 illustrates the wireless SFP with such a coax connector. FIG. 7 illustrates an external antenna having a coaxial connector. The external antenna can be connected to the coax connector on the wireless SFP via a coax cable attachment as depicted therein.

Figure 8:
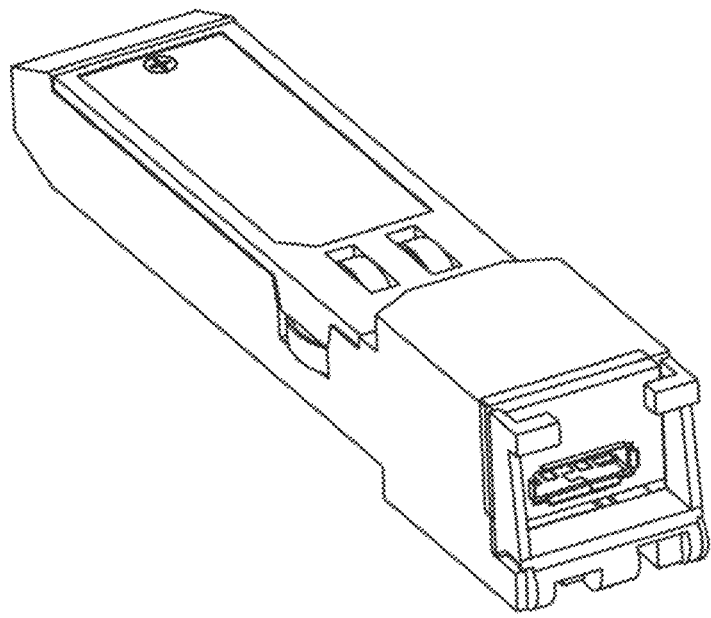
FIG. 8 is a perspective view of the wireless SFP of the present disclosure with a USB connector to attach an external antenna with a USB connector.
Figure 9:
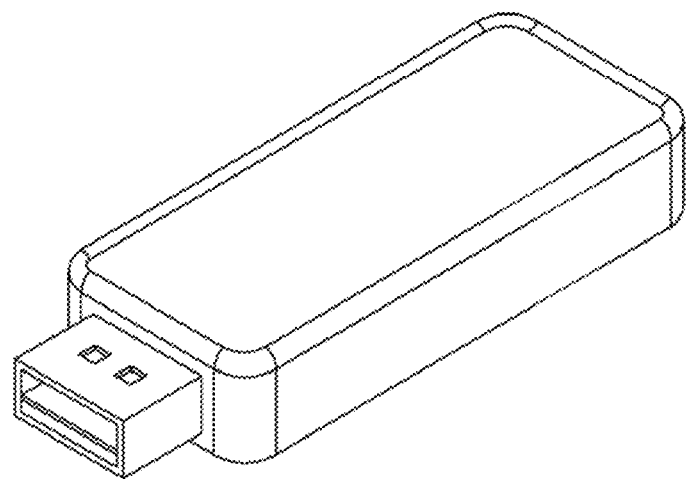
FIG. 9 is a perspective view of an external antenna with a USB connector for use with the wireless SFP of FIG. 8.

In an alternate embodiment, the wireless SFP includes a USB connector to support an external antenna. FIG. 8 illustrates the wireless SFP with such a USB connector. FIG. 9 illustrates an external antenna having a USB connector. The external antenna can be connected to the USB connector on the wireless SFP by plugging the complementary USB connector on the external antenna into the USB connector on the wireless SFP.

Figure 10:
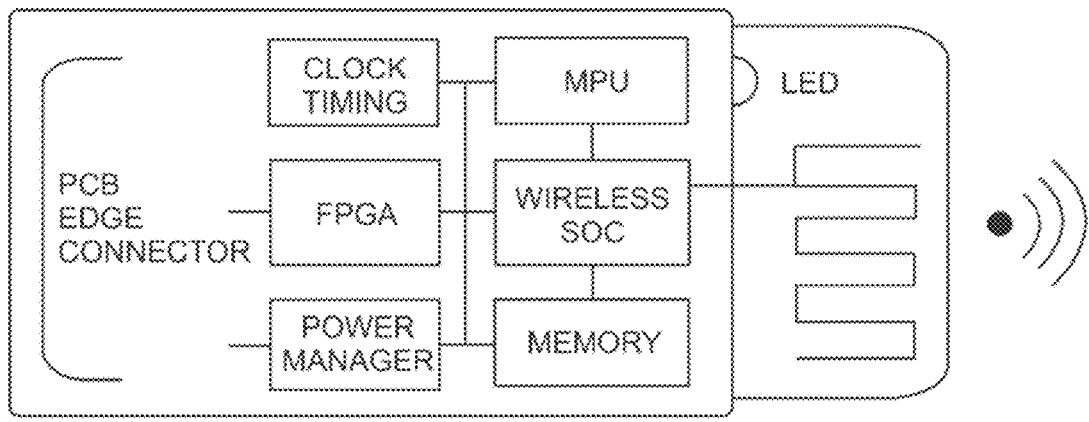
FIG. 10 is a schematic diagram of the printed circuit board of the wireless SFP of FIG. 5A, and illustrating the wireless SFP circuitry of the present disclosure.

FIG. 10 is a schematic diagram of the printed circuit board of the wireless SFP with internal antenna, and illustrating the wireless SFP circuitry. As can be seen, the wireless SFP circuitry includes (1) a wireless system on chip (SoC), (2) power supply circuitry, (3) one or more LEDs, (4) a microprocessor, (5) memory, and (6) a field programmable gate array (FPGA). The PCB also includes clock and timing circuitry, Antenna circuitry and an etched antenna. A back interface connector of the wireless SFP unit is also schematically illustrated, for connection to internal components of the network system when plugged into the chassis.

Figure 11:
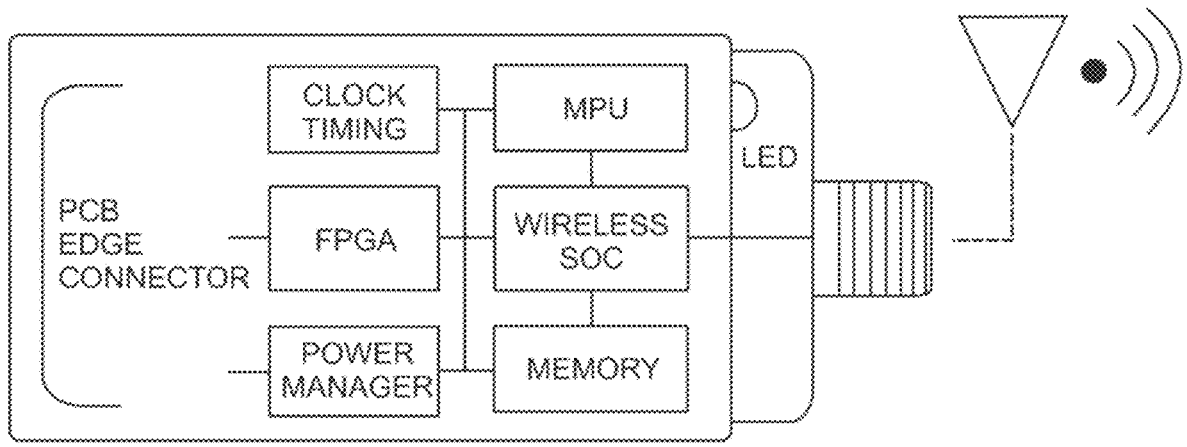
FIG. 11 is a schematic diagram of the printed circuit board of the wireless SFP of FIG. 6, and illustrating the wireless SFP circuitry.

FIG. 11 is a schematic diagram of the printed circuit board of the wireless SFP with external coax antenna, and illustrating the wireless SFP circuitry. As can be seen, the wireless SFP circuitry includes (1) a wireless system on a chip (SoC), (2) power supply circuitry, (3) light emitting diode (LED), (4) microprocessor, (5) memory, and (6) a field programmable gate array (FPGA). The PCB also includes clock and timing circuitry, Antenna circuitry and external coaxial connector for connection with an external antenna. A back interface connector of the wireless SFP unit is also schematically illustrated, for connection to internal components of the network system when plugged into the chassis.

Figure 12:
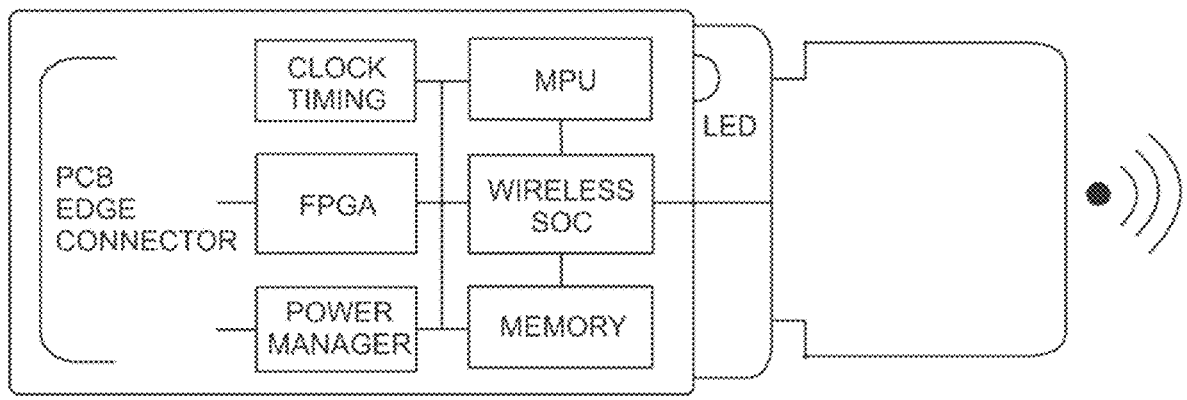
FIG. 12 is a schematic diagram of the printed circuit board of the wireless SFP of FIG. 8, and illustrating the wireless SFP circuitry.

FIG. 12 is a schematic diagram of the printed circuit board of the wireless SFP with external USB antenna, and illustrating the wireless SFP circuitry. As can be seen, the wireless SFP circuitry includes a (1) wireless system on a chip (SoC), (2) power supply circuitry, (3) light emitting diode (LED), (4) microprocessor, (5) memory, and (6) a field programmable gate array (FPGA). The PCB also includes clock and timing circuitry, Antenna circuitry and external USB type connector for connection with an external antenna. A back interface connector of the wireless SFP unit is also schematically illustrated, for connection to internal components of the network system when plugged into the chassis.

These components of the wireless SFP are described in more detail as follows:

(1) SoC Description

Figure 13:
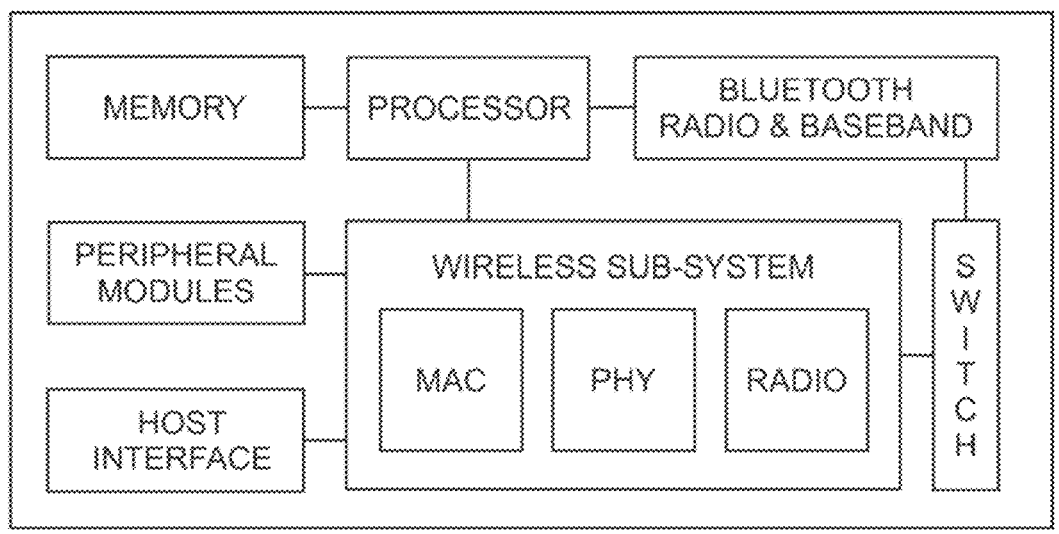
FIG. 13 is a schematic diagram of the wireless SoC chip of FIGS. 10-12.

The wireless SFP utilizes a wireless SoC, which is a highly integrated circuit incorporating a (1a) processor, (1b) wireless sub-system, (1c) Bluetooth sub-system, (1d) host interface, and (1e) peripheral modules. The wireless SoC also includes a memory and a switch. FIG. 13 is a schematic diagram of the wireless system on a chip (SoC).

(1a) SoC Processor

The wireless SoC processor is a 32-bit ARM Cortex type processor which offers high CPU performance and is optimized for low interrupt latency, low power consumption, in a very small size. The processor provides protocol processing for the Wireless and Bluetooth sub-systems. The processor also provides other general status and maintenance tasks.

(1b) SoC Wireless Sub-System

The SoC wireless sub-system includes an 802.11 a/b/g/n/ac radio, physical layer interface (PHY), and media access controller (MAC). The radio is a dual-band WLAN RF transceiver that has been optimized for use in 2.4 GHz and 5 GHz. The radio provides communications for applications operating in the globally available 2.4 GHz unlicensed ISM or 5 GHz U-NII bands. The wireless PHY provides signal processing, modulation and decoding of the received signal from wireless medium. The wireless MAC controls the access to the wireless PHY and mediates data collisions. The wireless MAC are comprised with transmit and receive controllers, transmit and receive FIFOs to buffer sending and receiving data, and circuitry to manage the RF system and the wireless PHY. The SoC wireless sub-system will interface to the antenna either through an antenna connector or without the antenna connector by means of an antenna etched on an extended PCB. The etch PCB antenna can achieve performance of 2 dB with minimal increase in the wireless SFP size. The use of an external antenna can achieve performance of 5 dB and the flexibility to position the external antenna by mean of a coaxial cable, as discussed above. The SoC will also support other wireless technologies such as IMT-2000 (4G), IMT-2020 (5G), and LoRa® and LoRaWAN® (trademarks of Semtech) exclusively or in combination with other wireless technologies.

(1c) SoC Bluetooth Sub-System

The SoC Bluetooth sub-system also includes an integrated Bluetooth radio and baseband core. The Bluetooth radio and baseband core is optimized for use in 2.4 GHz to provide low-power, low-cost, robust communications for applications operating in the globally available 2.4 GHz unlicensed ISM band. It is fully compliant with the Bluetooth Radio Specification and EDR specification and meets or exceeds the requirements to provide the highest communication link quality. Bluetooth Baseband Core (BBC) implements all of the time critical functions required for high-performance Bluetooth operation. The BBC manages the buffering, segmentation, and routing of data for all connections. It also buffers data that passes through it, handles data flow control, schedules transactions, monitors Bluetooth slot usage, optimally segments and packages data into baseband packets, manages connection status indicators, and composes and decodes packets and events. To manage wireless medium sharing for optimal performance, an external coexistence interface (switch) is provided that enables signaling between the one or two external collocated wireless devices such as Bluetooth.

(1d) SoC Host Interface

The SoC host interface supports SDIO circuitry for high speed data transfer from the wireless sub-system to the wireless SFP FPGA circuitry. The invention supports SDIO version 3.0, 4-bit modes (200 Mbps). The SoC host interface may also support an Ethernet RMII/GMII/RGMII/SGMII circuitry for 10/100/1000BASE-T and XAUI 10GBASE-T high speed data transfer.

(1e) SoC Peripheral Modules

The SoC peripheral modules support general purpose input and output control pins and serial communications to external devices.

(2) Power Supply Circuitry Description

The wireless SFP power supply circuitry is comprised of linear dropout and switching regulators to provide power to the wireless SoC, FPGA, processor, memory, and clock timing blocks. A power supervisor circuitry ensure proper power-up sequencing for hot-insertions and power brownout conditions.

(3) LED Description

FIG. 14 is a table describing the functionality of the wireless SFP using a light emitting diode (LED). The wireless SFP LED can communicate information on the wireless SFP. In this present disclosure, the wireless SFP has a single tri-color LED to communicate status information on the wireless SFP system and both wireless communication technology. The present disclosure will use Wi-Fi and Bluetooth as the first and second wireless technology, respectively. When LED is emitting a steady green color, the wireless SFP is normal, Wi-Fi is linked and Bluetooth is idle. When the LED is only emitting a blinking green color, the Wi-Fi is communicating with other wireless devices while the Bluetooth communication is idle. When the LED is emitting only a steady blue color, the Bluetooth is linked while the Wi-Fi is idle. When the LED is emitting only a blinking blue color, the Bluetooth is communicating with other wireless devices while the Wi-Fi is idle. If the LED is blinking green and blue with a 1 second cadence, the Wi-Fi and Bluetooth are both linked and communicating with their respective wireless devices. When LED is emitting a steady amber color, the wireless SFP is in test or maintenance mode, with wireless disabled. When LED is emitting a blinking amber color, the wireless SFP is in provisioning or upgrade mode. When LED is not emitting any color, there is no power or the wireless SFP is not operational. In is foreseen that the LED(s) will be able to communication data and information using very high frequency pulses such as Li-Fi technology. It is also contemplated that more than one LED may be used to indicate these and other features/status of the wireless SFP.

(4) Microprocessor Description

The microprocessor is an ARM Cortex processor system with the responsibility of managing and assisting the wireless SoC, the LED, and the FPGA. Additional responsibility of the microprocessor is to communicate to the host interface the SFP digital diagnostics monitoring per SFF-8472.

(5) Memory Description

The wireless SFP memory sub-system is comprised of ROM and RAM memory blocks. The ROM and RAM memory blocks will provide data software program and data storage and operation. The Flash ROM will also provide storage to mirror the software program. Mirroring will allow the wireless SFP to have remote software upgrades and provisioning.

(6) FPGA Description

Figure 15:
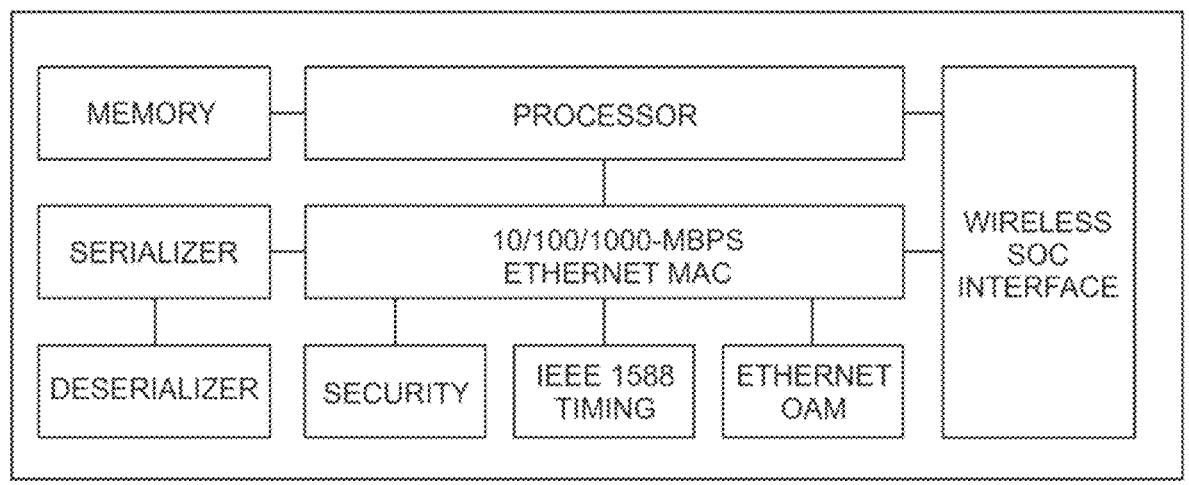
FIG. 15 is a schematic diagram of the wireless SFP field programmable gate array (FPGA) of FIGS. 10-12.

The wireless SFP FPGA provides the following subsystems, an (6a) Ethernet MAC, an (6b) Ethernet precision timing circuitry, an (6c) Ethernet OAM (operation, administration, maintenance) circuitry, (6d) security circuitry, a (6e) host interface, and a (6f) processor. The FPGA also includes a memory and serializer and deserializer circuitry. FIG. 15 is a schematic diagram of the wireless SFP field programmable gate array (FPGA).

(6a) Ethernet MAC Description

The Ethernet MAC provides optional protocol processing of the data from the host interface. The MAC sublayer provides addressing and channel access control mechanisms. The Ethernet MAC functionality may be bypassed for customer applications, such as performing test, maintenance, or network architecture applications. The Ethernet MAC controller can transmit and receive data at 10/100/1000 Mbs. It is foreseen that the Ethernet MAC could support 10 G, 40 G, and 100 Gbs as well.

(6b) Ethernet Precision Timing Description

The Ethernet precision timing block provides IEEE 1588v2 and SyncE functions. IEEE 1588v2 is a standard that defines a Precision Time Protocol (PTP) used in packet networking to precisely synchronize the real Time-of-Day (ToD) clocks and frequency sources in a distributed system to a master ToD clock, which is synchronized to a global clock source. The Ethernet precision time block provides IEEE1588 and SyncE functionality. IEEE1588 standard defines the Precision Time Protocol (PTP) that enables precise synchronization of clocks in a distributed network of devices. The PTP applies to systems communicating by local area networks supporting multicast messaging. This protocol enables heterogeneous systems that include clocks of varying inherent precision, resolution, and stability to synchronize. In both the transmit and receive directions 1588 packets are identified and timestamped with high precision. Software makes use of these timestamps to determine the time offset between the system and its timing master. Software can then correct any time error by steering the device's 1588 clock subsystem appropriately. The device provides the necessary I/O to time-synchronize with a 1588 master elsewhere in the same system or to be the master to which slave components can synchronize.

(6c) Ethernet OAM Description

The Ethernet OAM provides link and service OAM functionality per MEF and ITU Y.1731. The Ethernet OAM supports the service activation test loopback of ITU Y.1564 and RFC2544. Link OAM per IEEE 802.1ag. The Ethernet OAM support latching loopback per MEF46.

(6d) Ethernet Security Description

The Ethernet security implements the DES and Triple-DES (3DES) encryption standards, as described in NIST Federal Information Processing Standard (FIPS) publication 46-3, incorporated herein by reference. Each encryption type offers a compromise between service application speed, FPGA logic area, and customer application. The Data Encryption Standard (DES) is a 64-bit block cipher which uses a 56-bit key to encrypt or decrypt each block of data. Given the short key length, DES has been proven to be susceptible to brute force attacks and so is no longer considered secure for general use. Triple-DES (3DES) strengthens the security by combining three DES operations; an encrypt, a decrypt, and a final encrypt; each using a 56-bit key. This increases the effective key length, improving security. However, latterly 3DES has been superseded by the faster Advanced Encryption Standard (AES) algorithm, although it still finds use in security protocols such as IPsec and SSL/TLS for legacy purposes.

(6e) Host Interface Description

The host interface performs the data conversion from the wireless SoC sub-system to an SDIO or Ethernet media independent interface format.

(6f) Processor

The processor is a dual-core ARM Cortex processor system. The processor will assist in protocol processing, data management, and system administration for all functional blocks within the FPGA. The process will assist the Ethernet MAC, the IEEE 1588, the Ethernet OAM, and the security functional blocks.

The following is a description of the data flow received (Receive Data Flow) in the wireless SFPs of FIGS. 10, 11 and 12.

Wireless signals are received by the wireless SFP wireless SoC's Radio through the antenna connector by means of an external antenna or without the connector by means of the etch PCB antenna. The antenna will filter and convert the wireless signal to an electrical signal, which the electrical signal will be received by the wireless SoC radio. The radio's transmit and receive sections include all on-chip filtering, mixing, and gain control functions. The wireless signals will then be processed by the wireless PHY. The wireless PHY is designed to comply with IEEE 802.11ac and IEEE 802.11a/b/g/n single-stream specifications to provide wireless LAN connectivity supporting data rates from 1 Mbps to 433.3 Mbps for low-power, high-performance applications. The PHY has been designed to work in the presence of interference, radio nonlinearity, and various other impairments. It incorporates optimized implementations of the filters, FFT and Viterbi decoder algorithms. The PHY carrier sense has been tuned to provide high throughput for IEEE802.11g/11b hybrid networks with Bluetooth coexistence. Wireless signals from the PHY circuitry are then connected to a media access controller (MAC). The wireless MAC is designed to support high-throughput operation with low-power consumption. It does so without compromising the Bluetooth coexistence policies, thereby enabling optimal performance over both networks. In addition, several power saving modes have been implemented that allow the MAC to consume very little power while maintaining network-wide timing synchronization. The data from the MAC will then interface with the wireless SoC host interface, which will convert the data into an SDIO or Ethernet media independent format.

The wireless SoC data will then interface with the FPGA or ASIC. The FPGA or ASIC will either convert the SDIO data format or connect directly to the FPGA Ethernet MAC. The Ethernet MAC will provide protocol processing and update the data with IEEE 1588 or SyncE information. If required, the updated data from the Ethernet MAC will be encrypted by the security functional block. The data will be serialized and transmitted differentially at compatible voltage levels per the appropriate SFF specification document to the wireless SFP PCB edge connector.

The wireless data received from the Bluetooth will flow from the Bluetooth sub-system to the wireless SoC and SFP processor. The wireless SoC processor will inspect and process the data accordingly. The Bluetooth data may provide wireless mobile location, identity, status, etc., for the wireless SoC and SFP processor.

The following is a description of the data flow transmitted (Transmit Data Flow) in the wireless SFPs of FIGS. 10, 11 and 12.

The transmit data from the SFP PCB edge connector will interface with the FPGA. The FPGA will convert the serialized data format to the Ethernet MII format of the FPGA Ethernet MAC. The Ethernet MAC will provide protocol processing and update the data with IEEE 1588 or SyncE information. If required, the updated data from the Ethernet MAC will be encrypted by the security functional block. The transmit data from the FPGA will interface to the wireless SoC's host interface. The wireless SoC host interface will convert the transmit data to the SoC MAC for protocol processing. The transmit data will then interface to the SoC PHY and Radio. The SoC PHY and Radio will convert the transmit data RF signal to wireless using an external antenna attachment or the internal etched PCB antenna.

The Bluetooth wireless data will transmit from the wireless SFP and SoC processor to the wireless SoC Bluetooth sub-system. The transmit data from the Bluetooth sub-system will be interleaved by the Wi-Fi coexistence switch to either a connector for the external antenna or directly onto an etched PCB antenna. The Bluetooth data will be transmitted to other wireless SFP and wireless mobile devices. The data will consist of location, identity, status of all wireless SFP devices or wireless mobile devices, or IoT. The Bluetooth wireless data can also provide status information of the wireless SFP. The Bluetooth wireless data will also allow the wireless SFP to be provisioned, tested, and administered.

Figure 16:
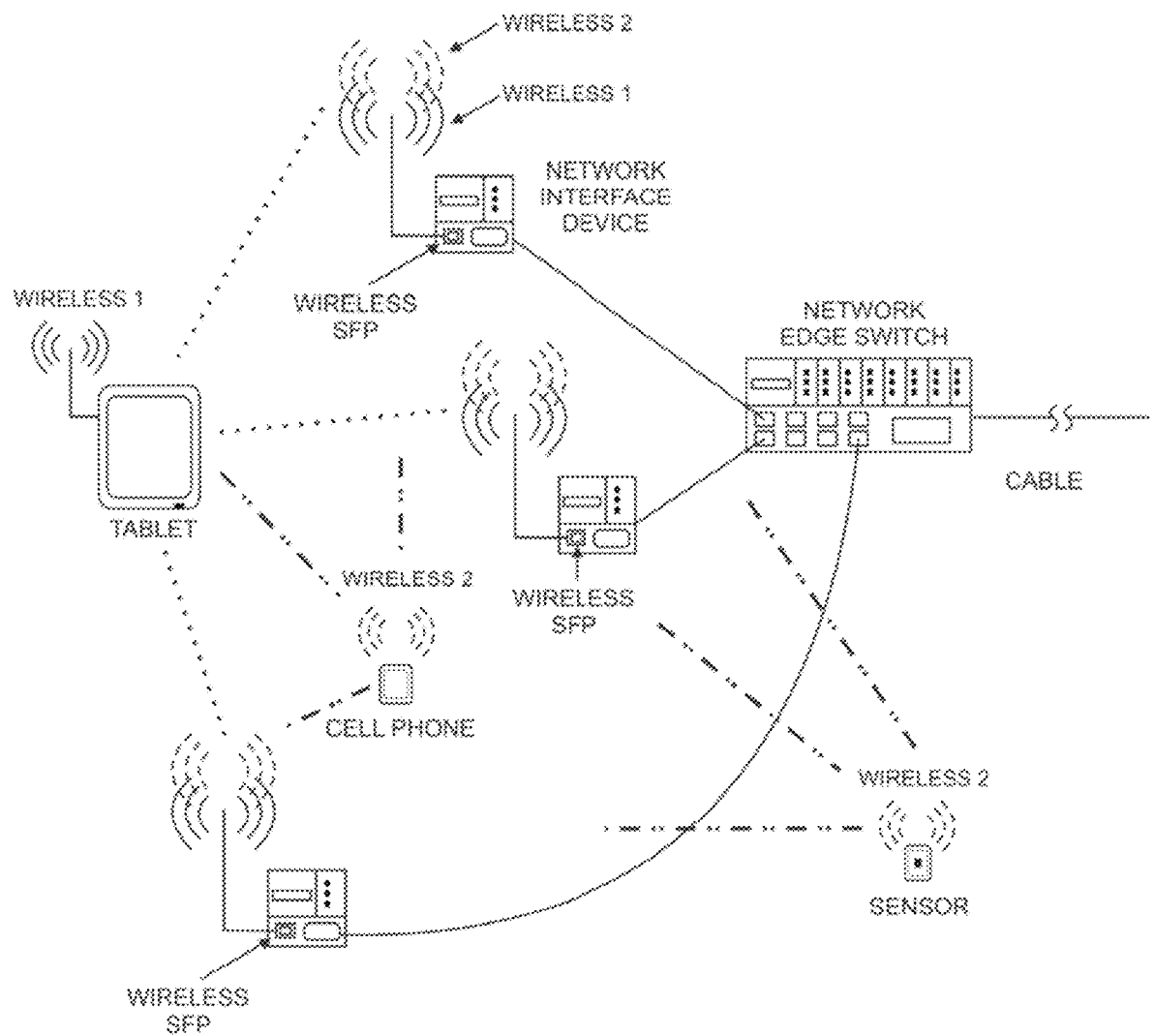
FIG. 16 is a schematic diagram illustrating a method of the present disclosure of Wi-Fi triangulation and Bluetooth communications involving three wireless SFPs and mobile devices.

FIG. 16 illustrates an exemplary embodiment of a method and system of the present disclosure used for Wi-Fi triangulation and Bluetooth communications involving three wireless SFPs and mobile devices. As illustrated, the three wireless SFP devices are placed into ports in three different network interface devices, each of which is connected to a network edge switch. These three wireless SFPs selectively communicate via both wireless 1 and wireless 2 signals with various devices. The signals can be triangulated such that the location of a device with a transmitter can be determined by measuring either the radial distance, or the direction, of the received signal from two or three different points, and the geographic position of the device can be pinpointed.

Figure 17:
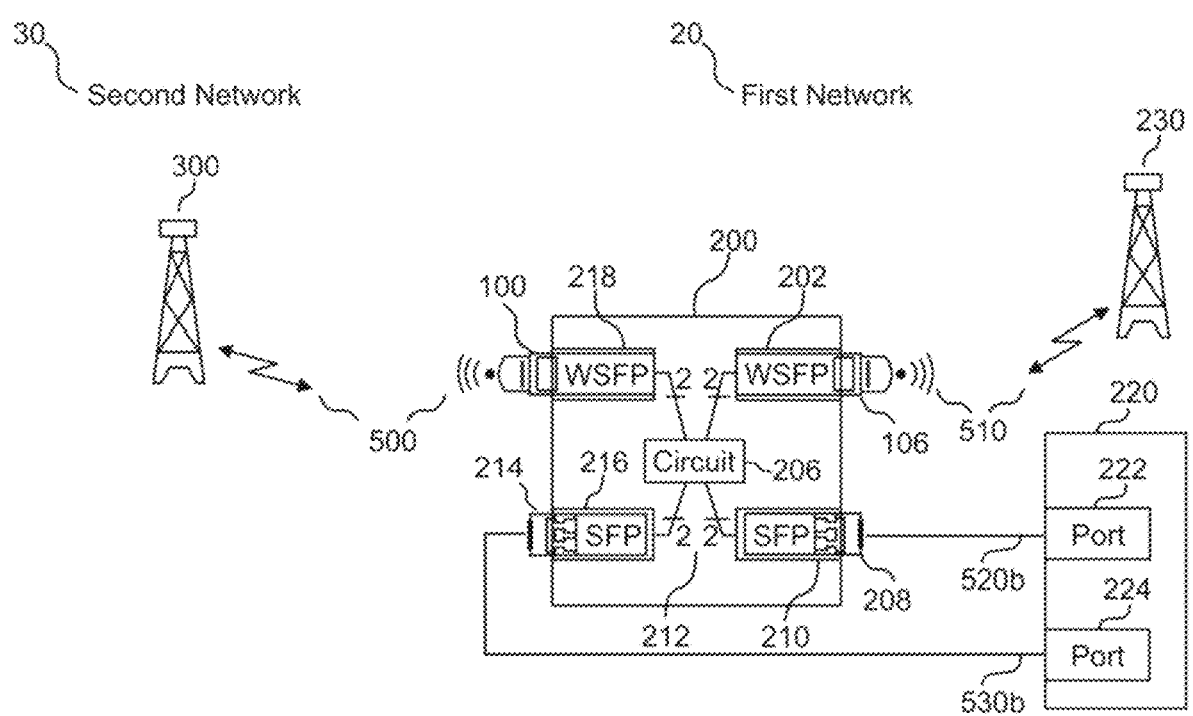
FIG. 17 is a schematic diagram of a telecommunication system illustrating the use of a wireless SFP as a wireless repeater.

FIG. 17 illustrates a diagram of another embodiment of the communications system and equipment of the present disclosure of a wireless Repeater between a First Network 20 and a Second Network 30. The wireless SFP (WSFP) Devices and communication equipment establishes a wireless Repeater between a First Network 20 and a Second Network 30. As disclosed in U.S. application Ser. No. 16/917,475 and U.S. Pat. No. 10,637,776, the communication equipment Device 200 hosts WSFP and SFP Devices and allows the communication service of the First Network 20 and Second Network 30 to be monitored, and/or injected, and or provide redundancy.

In this embodiment, the wireless signal extender or repeater is implemented by using two WSFP Devices 100 and 106 with the same wireless signal interface or WSFP device type. An example is WSFP Devices 100 and 106 supporting IEEE 802.11 (Wi-Fi) standard or both WSFP Devices supporting 4G and 5G. Although WSFP Devices 100 and 106 conform to the same wireless signal interface one or both of the WSFP Devices may be provisioned to have different wireless signal formats or options. As an example, the IEEE 802.11 standard defines operation for wireless networks in both the 2.4 GHz and 5 GHz frequency ranges. The 2.4 GHz band is defined into 11 channels (1-11) and the 5 GHz band can have 36 to 165 channels. Adjacent Channel Interference (ACI) and Co-Channel Interference (CCI) will result in Wi-Fi signal disruption and performance degradation when 2.4 GHz or 5 GHz channels overlap and conflict. A static channel plan or a vendor's dynamic channel assessment/assignment algorithm, a WSFP device with a IEEE802.11 (Wi-Fi) signal interface with a static or vendor's channel plan may require one or both WSFP Devices to be provisioned for different channels or other end-user requirements.

A wireless signal extender can address applications where the wireless signal does not have the signal strength to overcome physical distance and/or withstand impairments during the wireless transmission to the Second Network 30.

A service provider network will typically use a wireless signal for wide area network or long reach applications, such as direct wireless, satellite, microwave, or cellular services LTE, IMT-2000 (4G) and IMT-2020 (5G). The WSFP Device provides for a specific or combination of wireless signals and formats, such as IEEE 802.11a, b, g, n, ac, ax (Wi-Fi) signal, IEEE 802.15, Bluetooth wireless signals, IMT-2000 (4G), IMT-2020 (5G), and LoRa® and LoRaWAN® (trademarks of Semtech), or in combinations with other IoT wireless signals (Bluetooth, Zigbee, Lora, etc).

The First Network 20 includes a Wireless Tower or Satellite Dish 230 and a Communication Equipment 220 having Ports 222 and 224. The First Network 20 also includes a communication equipment Device 200 having multiple Ports 202, 210, 216 and 218 as illustrated. As disclosed in U.S. application Ser. No. 16/917,475 and U.S. Pat. No. 10,637,776, the Device 200 hosts SFP devices and allows the communication service of the First Network 20 and Second Network 30 to be monitored, and/or injected, or provides redundancy. The Device 200 has a wireless SFP (WSFP) Device 106 connected to Port 202, a SFP Device 208 connected to Port 210, a SFP Device 214 connected to Port 216, and wireless SFP (WSFP) Device 100 connected to Port 218. The Device 200 also has Circuitry 206 which defines the signal paths between the Ports of the Device 200. The Circuitry 206 is comprised of input and output differential amplifiers connected to multiplexer switches through Differential Paths 212.

The Second Network 30 includes a Wireless Tower or Satellite Dish 300 used for a wireless signal for wide area network or long reach applications, such as direct wireless, satellite, microwave, or cellular services LTE, IMT-2000 (4G) and IMT-2020 (5G). A wireless Signal 500 is used to interface the communication services between the First Network 20 and the Second Network 30 through Device 200, specifically connecting the wireless Signal 500 from WSFP Device 100 to the Wireless Tower or Satellite Dish 300 of the Second Network 30. The Device 200 in turn connects to the Wireless Tower 230 of the First Network 20 through a second wireless Signal 510, specifically connecting the WSFP Device 106 connected to Port 202 of Device 200 of the First Network 10. A cable 520b is used to monitor and/or test the communication services of the Second Network 30, specifically connecting SFP Device 208 to Port 222 of the Communication Equipment 220. A cable 530b is used to monitor, test, or provide redundancy to the communication services of the First Network 20, specifically connecting SFP Device 214 to Port 224 of the Communication Equipment 220.

Figure 18:
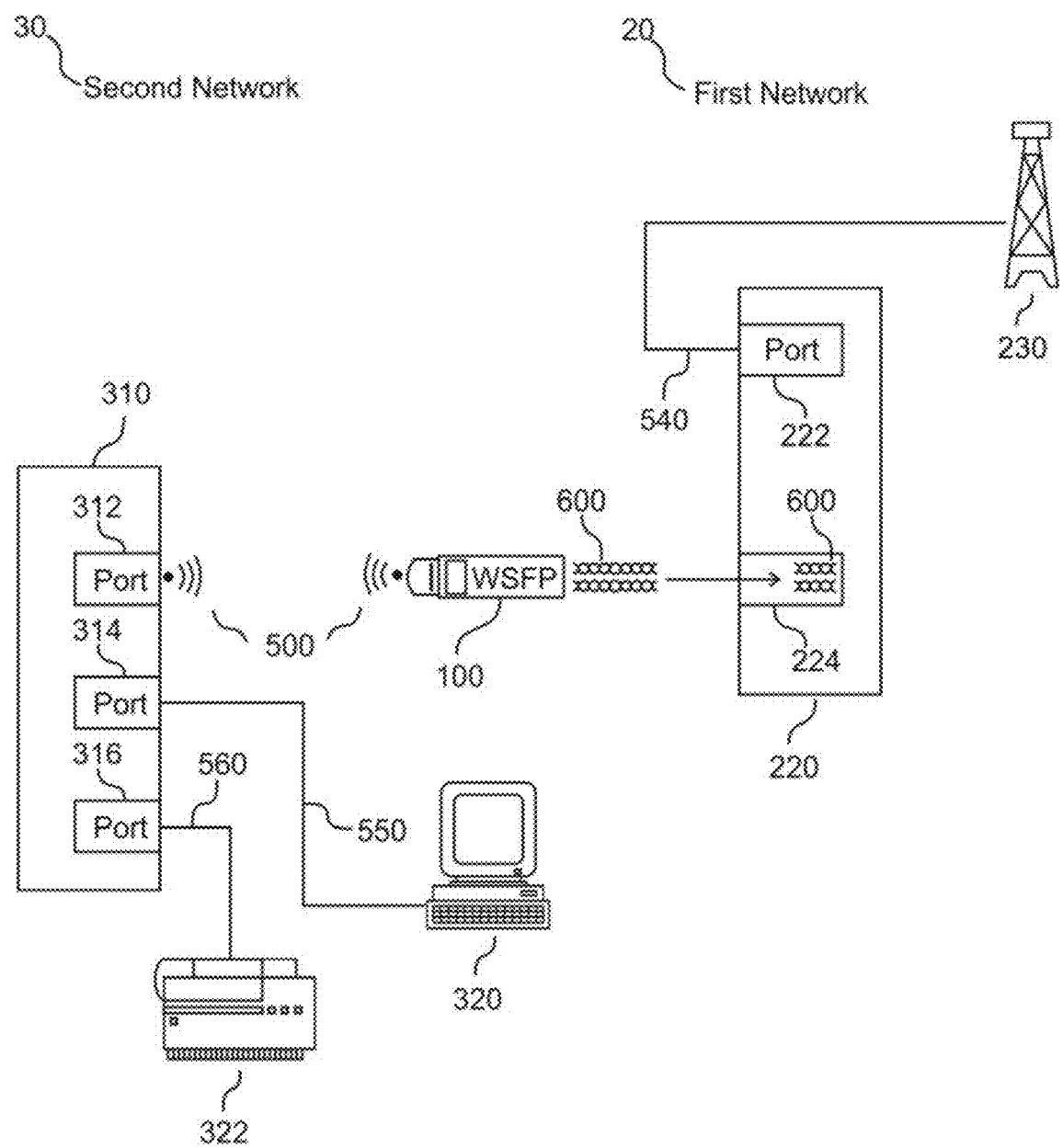
FIG. 18 is a schematic diagram of a telecommunication system illustrating the use of a wireless SFP as a wireless bridge.

FIG. 18 illustrates another exemplary embodiment of a method and system of the present disclosure for the wireless SFP Device of the present invention also functioning as a wireless Bridge. As a wireless Bridge, the present invention can be deployed as a cost-effective method to bridge communication services between networks. The wireless SFP (WSFP) Device 100 bridges communication services from a First Network 20 to Second Network 30. The WSFP Device 100 can also be used to bridge communications between sub-networks of a Network. In either application, the WSFP Device 100 bridges and connects two networks together over the wireless signal. The WSFP Device 100 will provide Layer 2 connection between the First Network 20 and Second Network 30. The WSFP Device 100 acts as a client to the Communication Equipment, where each end of the wireless bridge will provide a link within the same Subnet.

The First Network 20 includes Communication Equipment 220 having a Port 222 and Port 224. A Cable 540 connects Port 222 of the Communication Equipment 220 to the Service Provider Wireless Tower 230 of the First Network 20. Port 224 of the Communication Equipment 220 provides an SFP port for the WSFP Device 100. The Second Network 30 includes a Communication Equipment 310 with a wireless Port 312 and additional Ports 314 and 316. Port 314 connects to Computer 320 through Cable 550 and Port 316 connects to Printer 322 through Cable 560.

The WSFP Device 100 bridges the wireless communication services between the First Network 20 and the Second Network 30, specifically interfacing the wireless Signal 500 from wireless Port 312 of the Communication Equipment 310 of the Second Network 30. The WSFP Device 100 in turn connects and interfaces differential Signals 600 to the SFP Port 224 of Communication Equipment 220 of the First Network 20.

Figure 19:
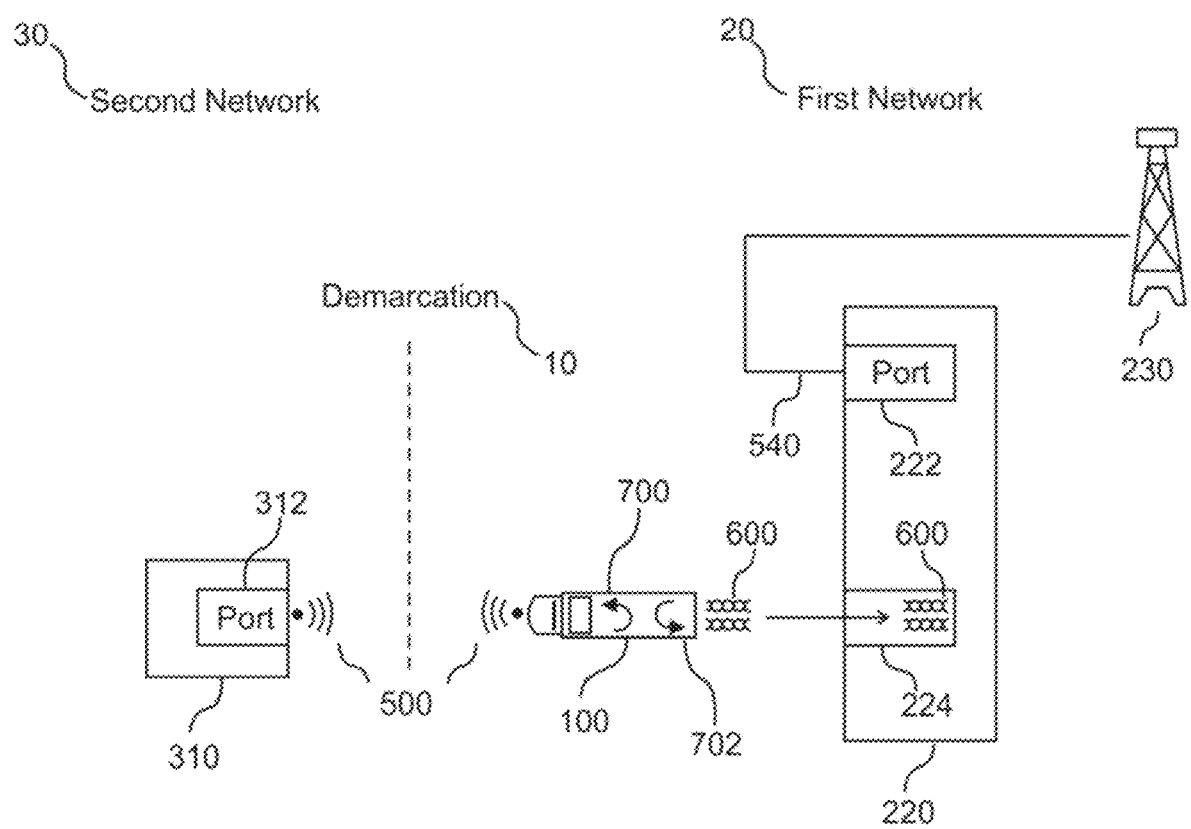
FIG. 19 is a schematic diagram of a telecommunication system illustrating the use of a wireless SFP as a wireless demarcation point.

FIG. 19 illustrates a diagram of another embodiment of the communications system and equipment of the present disclosure of a wireless demarcation point between a First Network 20 and a Second Network 30. A wireless demarcation point establishes a physical or virtual dividing line or boundary between the First Network 20 and a Second Network 30. A physical wireless demarcation point may consist of the wireless SFP (WSFP) Device 10. A virtual wireless demarcation point will be the wireless Signal 500 emanating from the WSFP Device 100. A physical or virtual wireless demarcation point will establish the responsibilities of wireless communication service performance, installation, and maintenance. The WSFP Device 100 will also provide testing functionality for fault sectionalization.

The First Network 20 includes Communication Equipment 220 having a Port 222 and Port 224. Port 222 of Communication Equipment 220 provides communication service from the Wireless Tower 230. Port 224 of Communication Equipment 220 provides communication service to the Second Network 30. The Second Network 30 includes a Communication Equipment 310 having a Port 312.

The First Network 20 establishes a Demarcation Point 10 with the WSFP Device 100 through Port 224 of the Communication Equipment 220 of the First Network 20. The WSFP Device 100 is used to interface the communication services between the First Network 20 and the Second Network 30, specifically interfacing the wireless Signal 500 from wireless Port 312 of the Communication Equipment 310 of the Second Network 30. The WSFP Device 100 in turn interfaces differential Signals 600 to Port 224 of the Communication Equipment 220 of the First Network 20. The Communication Equipment 220 in turn connects to the Wireless Tower 230 of the First Network 20 through a Cable 540.

The WSFP Device 100 can provide fault sectionalizing of the Second Network wireless communication service path by provisioning a signal Loopback 700 on the wireless Signal 500. The WSFP Device 100 establishes a signal Loopback 700 by receiving the wireless Signal 500 from the wireless Port 312 of the Communication Equipment 310 of the Second Network 30 and looping back this signal back to the wireless Port 312 of the Communication Equipment 310 of the Second Network 30.

The WSFP Device 100 can also provide fault sectionalizing of the First Network wireless communication service path by provisioning a signal Loopback 702 on the First Network communication service path. The WSFP Device 100 establishes a signal Loopback 702 by receiving the differential Signal 600 from Port 224 of the Communication Equipment 220 of the First Network 20 and looping back this signal back to Port 224 of the Communication Equipment 220 of the First Network 20.

Figure 20:
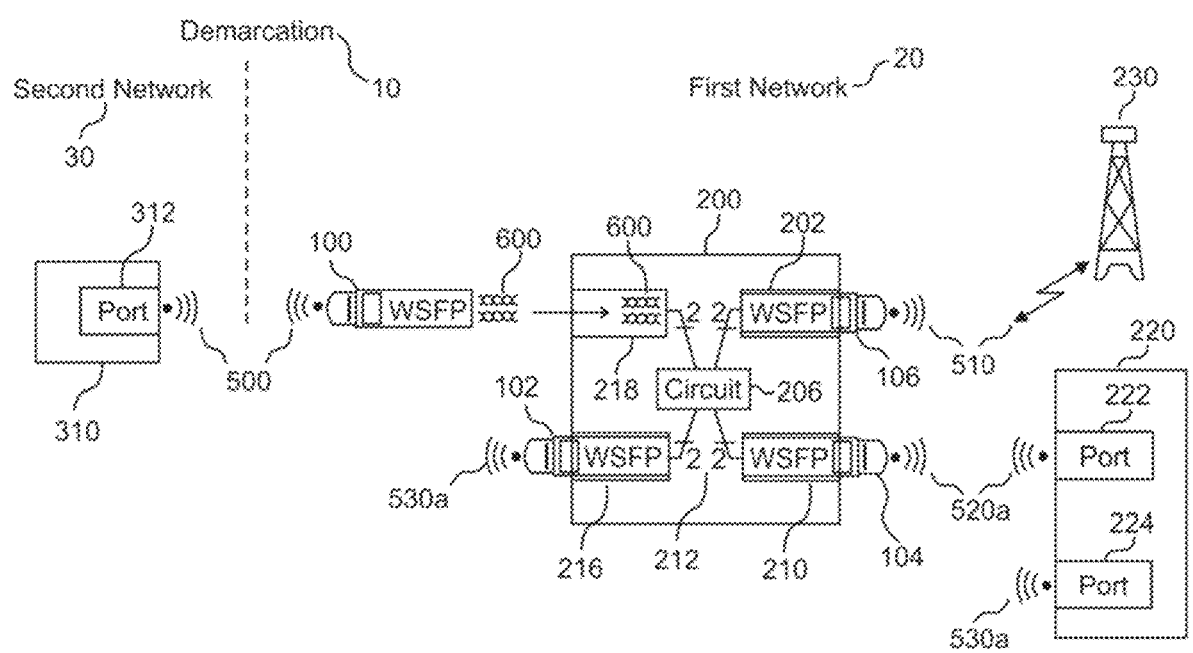
FIG. 20 is a schematic diagram of a telecommunication system illustrating another use of a wireless SFP as a wireless demarcation point.

FIG. 20 illustrates a diagram of another embodiment of the communications system and equipment of the present disclosure of a wireless demarcation point between a First Network 20 and a Second Network 30. A wireless demarcation point establishes a physical or virtual dividing line or boundary between the First Network 20 and a Second Network 30. A physical wireless demarcation point consists of the wireless SFP (WSFP) Device 100 or the WSFP Device 100 and the host communication equipment Device 200. A virtual wireless demarcation point will be the wireless Signal 500 emanating from the WSFP Device 100. The WSFP Device 100 will establish a Demarcation Point 10 between a First Network 20 and a Second Network 30 and for the communication service to be transported. As disclosed in U.S. application Ser. No. 16/917,475 and U.S. Pat. No. 10,637,776, the Device 200 hosts SFP devices and allows the communication service of the First Network 20 and Second Network 30 to be monitored, and/or injected, and or provides redundancy.

The First Network 20 includes a Wireless Tower 230 and a Communication Equipment 220 having wireless Ports 222 and 224. The wireless Ports 222 and 224 of the Communication Equipment 220 provide communication service monitor and/or test functions. The First Network 20 also includes a communication equipment Device 200 having multiple Ports 202, 210, 216 and 218 as illustrated and disclosed in U.S. application Ser. No. 16/917,475 and U.S. Pat. No. 10,637,776. Device 200 has a WSFP Device 106 connected to Port 202, a WSFP Device 104 connected to Port 210, a WSFP Device 102 connected to Port 216, and a WSFP Device 100 connected to Port 218. The Device 200 also has Circuitry 206 which defines the signal paths between the Ports of the Device. The Circuitry 206 is comprised of input and output differential amplifiers connected to multiplexer switches through Differential Paths 212.

The First Network 20 establishes a Demarcation Point 10 with the WSFP Device 100. The WSFP Device 100 is used to interface the communication services between the First Network 20 and the Second Network 30, specifically interfacing the wireless Signal 500 from wireless Port 312 of the Communication Equipment 310 of the Second Network 30. The WSFP Device 100 in turn interfaces differential Signals 600 to Port 218 of Device 200 of the First Network 20. The Device 200 in turn connects to the Wireless Tower 230 of the First Network 20 through a wireless Signal 510. A wireless Signal 520a is used to monitor and/or test the communication services of the Second Network 30, or provide redundancy for the communication services transported by wireless Signal 510 of the First Network 20, specifically connecting WSFP Device 104 to the wireless Port 222 of the Communication Equipment 220. A wireless Signal 530a is used to monitor and/or test the communication services of the First Network 20, or provide redundancy for the communication services transported by signal 500, specifically connecting WSFP Device 102 to Port 224 of the Communication Equipment 220.

Figure 21:
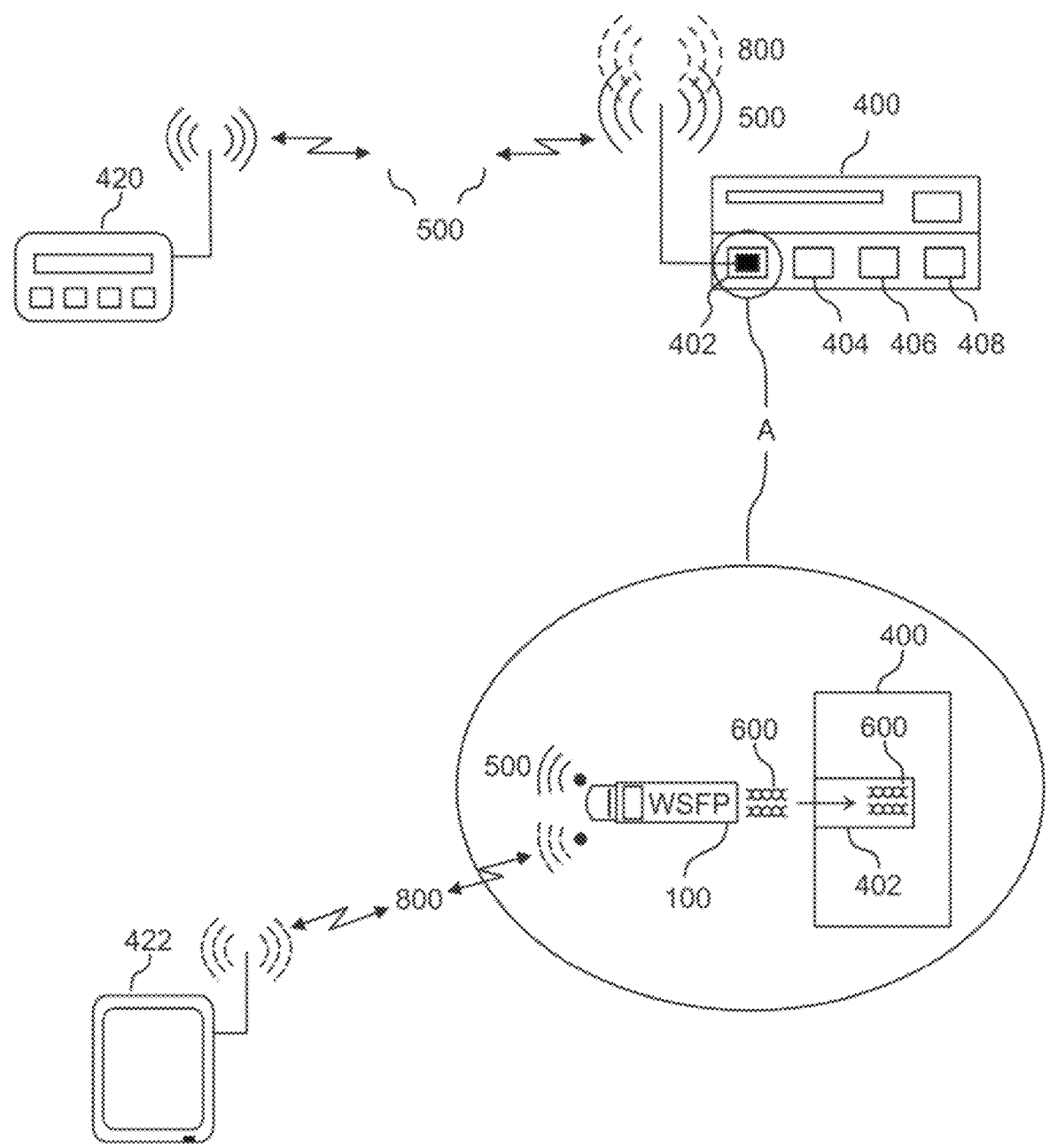
FIG. 21 is a schematic diagram of a telecommunication system illustrating the use of a secondary wireless technology for status, provisioning, and testing of the wireless SFP.

FIG. 21 illustrates the use of the wireless SFP (WSFP) Device 100 having a second wireless channel or Signal 800 for provisioning, authenticating, activating, monitoring, or testing. As previously discussed in the Background section above, the SFP devices are designed to be compliant to the industry standard SFF-8472 digital diagnostics monitoring (DDM) functions which defines management specifications on the SFP identity, status, provisioning, and other vendor specific information and controls. The DDM information is communicated between the communication equipment and the SFP device through a serial communication interface Inter-Integrated Circuit (I2C). This I2C interface is low speed serial communication protocol implemented using two electrical signals, which the electrical signal interface is located at the SFP device printed circuit board edge connector. When the SFP device is inserted into the communication equipment, the communication equipment may not recognize or accept the SFP. The communication equipment software database may not support or restrict the SFP device from proving status information, provisioning, or operating. This restriction is referred as "SFP Lockout", which the communication equipment will only allow specific SFP devices to be installed or activated. The Service Provider or Network Administrator may have operational, administration, and maintenance procedures which may require the SFP device to be monitored, provisioned, authenticated, activated, or tested independently from the communication equipment or in sequence with other operational procedures or equipment. As an example, the Service Provider's method and procedures for the installation of new communication services may require the wireless SFP to be pre-provisioned and tested before provisioning or activating the primary wireless signal, or activating the communication equipment. The ability to use the secondary wireless technology will provide the Service Provider or Network Administrator the ability to pre-provision, test, or manage the WSFP Device 100 without coordinating with the communication equipment without disruption or performance degradation of the wireless Signal 500. To provision, authenticate, and activate the WSFP Device 100 for 802.11 wifi service, the secondary wireless signal or channel will be used to set the Service Set Identifier (SSID) of the Network, the Band type (2.4 GHz, 5 GHz, Above 6 GHz, and other band types), channel number, encryption (Open, WEP, WPA, WPA2), functionality (Access Point or Station), IP Address, and other types of identification or configuration settings. Provisioning and activation for other wireless services such as 5G, LoRa, Zigbee would be similar in scope. QR code scan, zero-touch provisioning, or minimal touch provisioning are methodologies to minimize provisioning, authenticating, and activating the WSFP Device 100.

As illustrated in FIG. 21, the network includes Communication Equipment 400 having SFP Ports 402, 404, 406, and 408. Communication Equipment 420 is a wireless communication device such as a Router or Switch. The WSFP Device 100 provides wireless Signal 500 between Communication Equipment 400 and 420. The WSFP Device 100 provides a second wireless Signal 800 to a wireless Device 422. The second wireless Signal 800 allows the WSFP Device 100 to be provisioned, to provide status, or initiate tests of the wireless Signal 500, the WSFP Device 100, or the host Communication Equipment 400.

Oval circle A is an expanded illustration of the wireless WSFP Device 100 connected to Port 402 of the Communication Equipment 400, specifically interfacing and connecting the WSFP Device 100 differential Signals 600 to Port 402 of the Communication Equipment 400.

Figure 22:
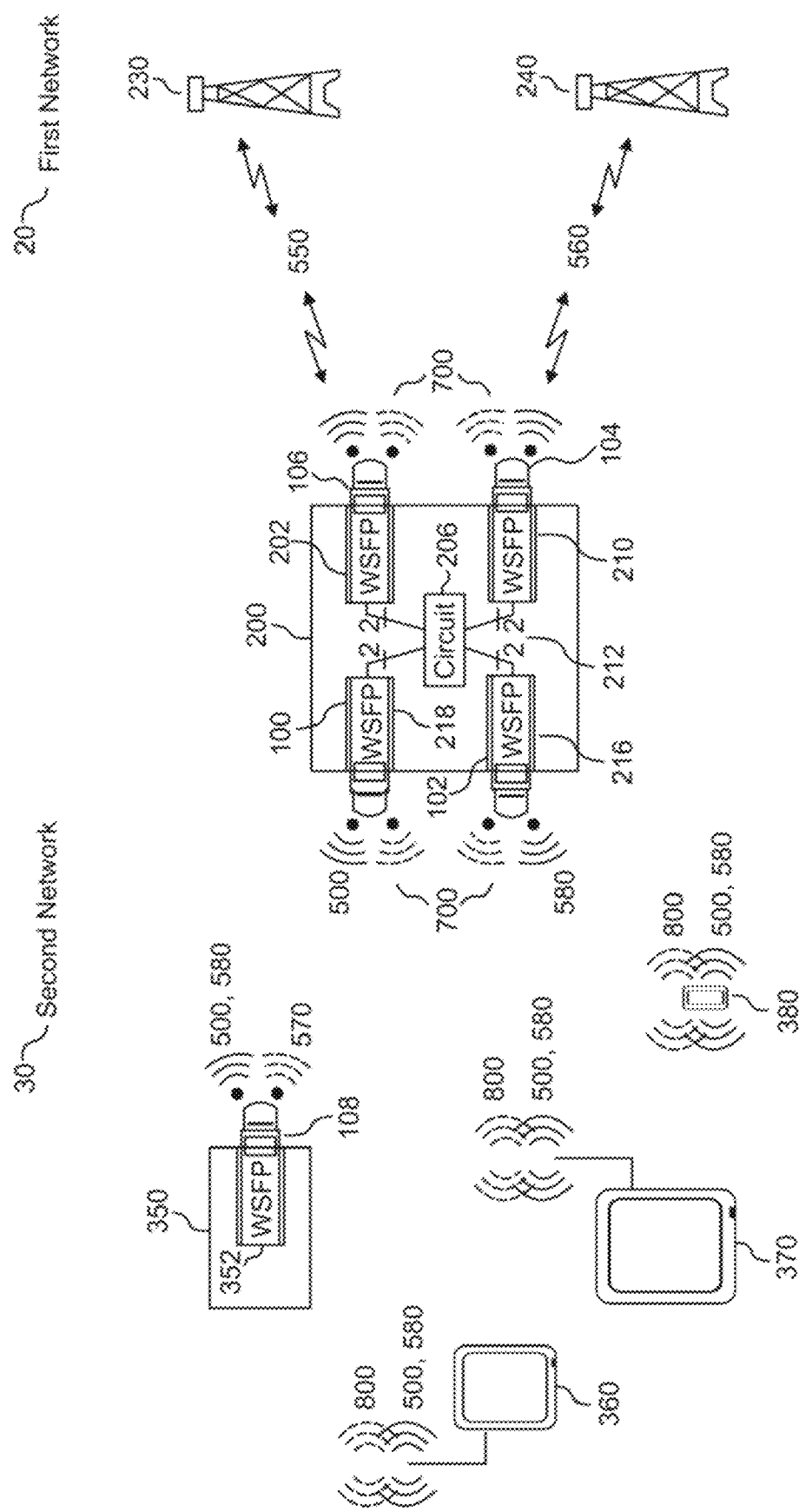
FIG. 22 is a schematic diagram of a telecommunication system illustrating the use of a secondary wireless technology for communications.

FIG. 22 illustrates another use of the wireless SFP (WSFP) Devices 100, 102, 104, and 106 secondary wireless Signal 800 to establish a wireless signal mesh network for wireless Signals 500 and 580 of the Second Network 30 and wireless signal redundancy for wireless Signals 550 and 560 of the First Network 20. The secondary wireless Signal 800 can also locate, monitor, and track other wireless devices. As disclosed in U.S. application Ser. No. 16/917,475 and U.S. Pat. No. 10,637,776, the Device 200 hosts SFP devices and allows the communication service of the First Network 20 and Second Network 30 to be monitored, and/or injected, redundancy, on-demand, or full cut-thru.

The First Network 20 includes a Wireless Tower 230 and 240. The Second Network 30 includes communication equipment Device 200 having multiple Ports 202, 210, 216 and 218 as illustrated and disclosed in U.S. application Ser. No. 16/917,475 and U.S. Pat. No. 10,637,776. Device 200 has a WSFP Device 106 connected to Port 202, a WSFP Device 104 connected to Port 210, a WSFP Device 102 connected to Port 216, and a WSFP Device 100 connected to Port 218. The Device 200 also has Circuitry 206 which defines the signal paths between the Ports of the Device. The Circuitry 206 is comprised of input and output differential amplifiers connected to multiplexer switches through differential Paths 212. The Second Network 30 also includes a Communication Equipment 350 having a WSFP Device 108 connected to Port 352, a Communication Equipment 360 with two wireless signals, a Communication Equipment 370 with two wireless signals, and a Communication Equipment 380 with two wireless signals.

A wireless Signal 550 is used to interface the communication services between the Wireless Tower 230 of the First Network 20 and the Device 200 of the Second Network 30, specifically connecting the wireless Signal 550 from WSFP Device 106 connected to Port 202 of Device 200 of the Second Network 200. The Device 200 in turn connects WSFP Device 100 and/or 102 to the WSFP Device 108 of Communication Equipment 350, and Communication Equipment 360, 370, and 380 with wireless Signal 500 and/or 580. The WSFP Device 100 and 102 can be provisioned as a Bridge, Repeater, or Access Point. The WSFP Devices 100 and 102 can use the second wireless Signal 800 to allocate, control, and divert wireless Signals 500 and 580 among WSFP Devices 100 and 102, and Communication Equipment 350, 360, 370, and 380. The WSFP Devices 100 and 102 can also use the secondary wireless Signal 800 to locate, monitor, and track Communication Equipment 350, 360, 370, and 380.

A wireless Signal 560 is used to interface the communication services between the Wireless Tower 240 of the First Network 20 and the Device 200 of the Second Network 30, specifically connecting the wireless Signal 560 from WSFP Device 104 connected to Port 210 of Device 200 of the Second Network 200. The Device 200 in turn connects WSFP Device 100 and/or 102 to the WSFP Device 108 of Communication Equipment 350 and Communication Equipment 360, 370, and 380 with wireless Signal 500 and/or 580. The WSFP Device 108 can be provisioned as a Bridge, Repeater, or Station. The WSFP Device 104 and 106 can use the second wireless Signal 800 to allocate, control, and divert wireless Signals 550 and 560 among WSFP Devices 104 and 106, and the Wireless Towers 230 and 240. The WSFP Devices 104 and 106 can also use the secondary wireless Signal 800 to locate, monitor, and track Communication Equipment 350, 360, 370, and 380.

Figure 23A:
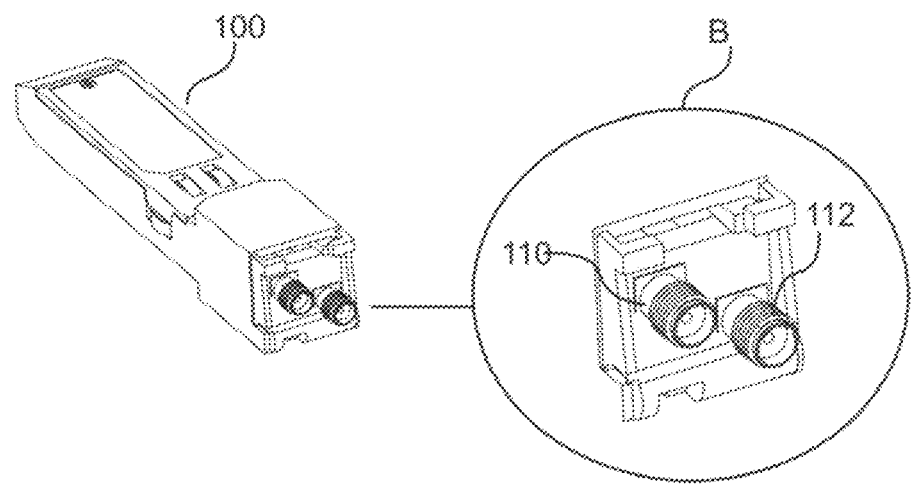
FIG. 23A is a perspective view of a wireless SFP with two SMA female coaxial connectors.
Figure 23B:
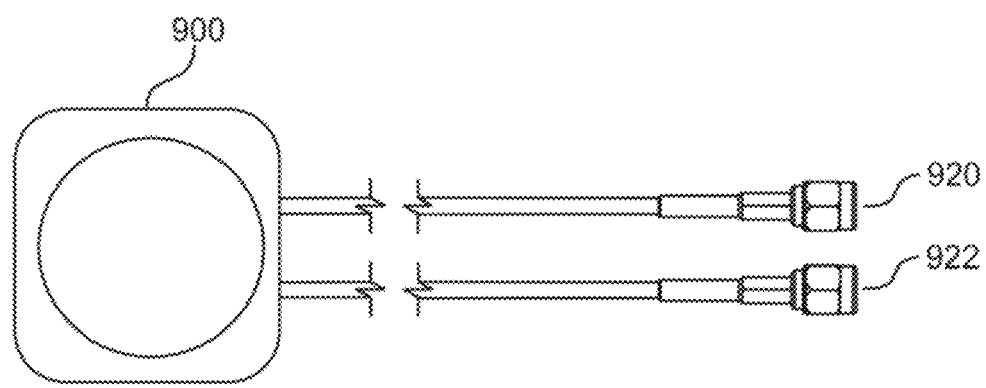
FIG. 23B is a perspective view of an external MIMO antenna.
Figure 23C:
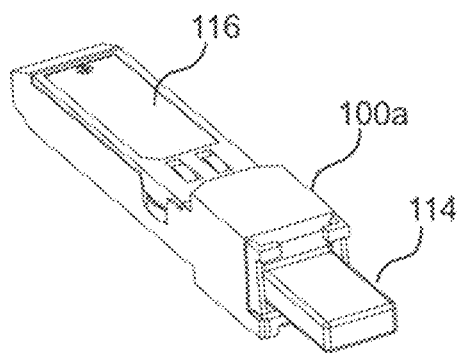
FIGS. 23C and 23D are perspective views of a wireless SFP with MIMO antennas implemented with printed circuit board (PCB) traces.
Figure 23D:
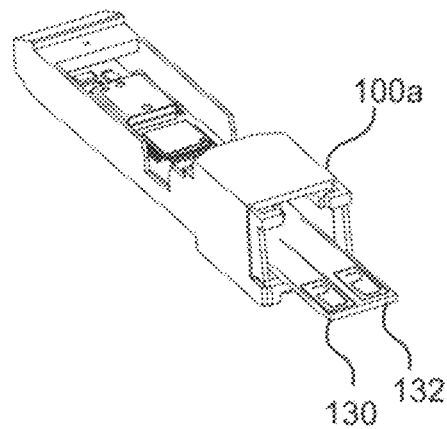

FIG. 23A-C illustrates the wireless SFP (WSFP) Device 100 with two antennas. The WSFP Device 100 can increase the wireless signal performance, data bandwidth, and reliability by using multiple-input multiple-output (MIMO) antenna technology. MIMO antenna technology using two or more antennas increases wireless signal transmission distance, mitigates wireless signal interference, and increases wireless signal reliability. There are different technologies to achieve multiple antennas such as multiple-input multiple-output (MIMO), adaptive antennas, and fixed beam antennas. FIG. 23A is a perspective view of the WSFP Device 100 implementing MIMO antenna technology with female coaxial connectors. A Circle B illustrates an expanded view of the SMA female coaxial Connectors 110 and 112. FIG. 23B illustrates the external MIMO Antenna 900 with two coaxial cables with male SMA coaxial Connectors 920 and 922. The WSFP 100 Device female SMA coaxial Connectors 110 and 112 will connect to the external MIMO Antenna 900 male SMA coaxial Connectors 920 and 922. FIGS. 23C and 23D are perspective views of another embodiment of the WSFP Device 100a with MIMO antennas implemented with printed circuit board (PCB) traces. In FIG. 23C, WSFP Device 100a is shown with top housing 116 and antenna cover 114. In FIG. 23D, WSFP Device 100a is shown with top housing 116 and antenna cover 114 removed to illustrate the two printed circuit board (PCB) traces to function as PCB Antennas 130 and 132.

Figure 24A:
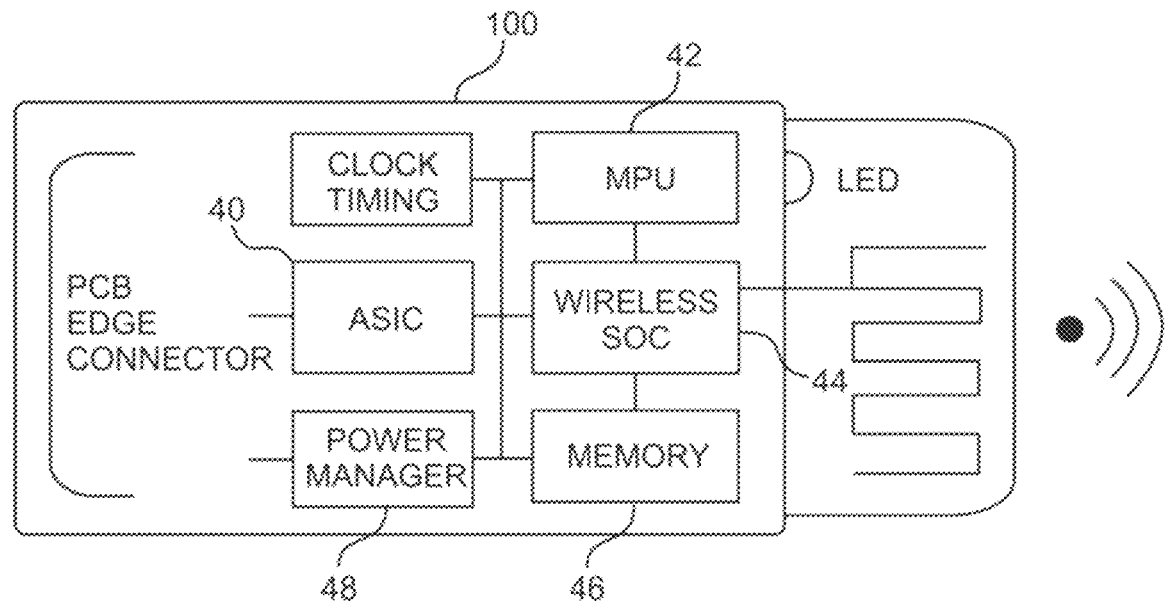
FIG. 24A is a schematic diagram of a wireless SFP using an ASIC to replace the FPGA circuitry.
Figure 24B:
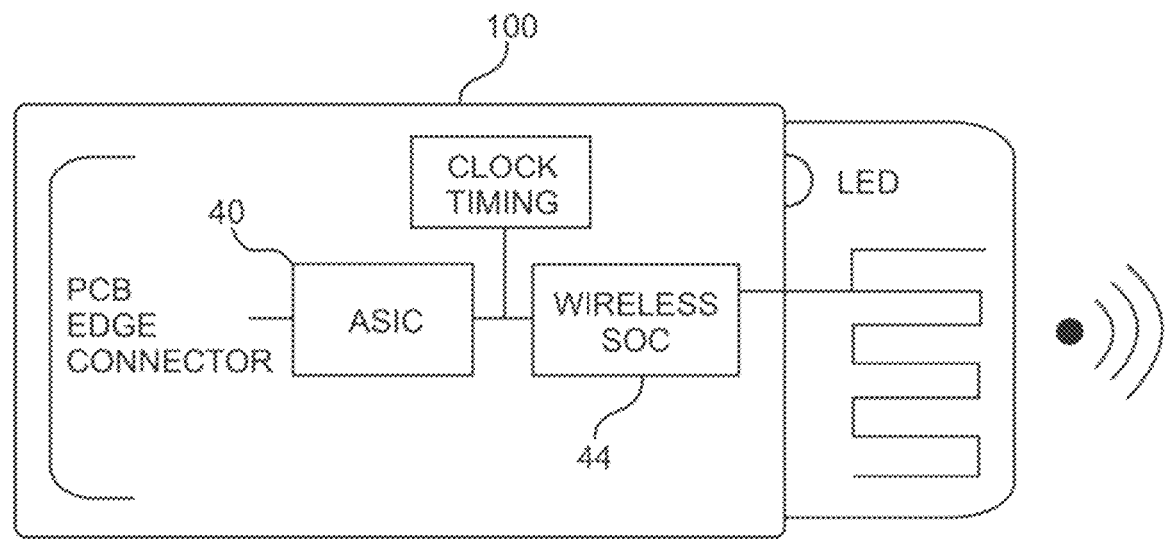
FIG. 24B is another schematic diagram of a wireless SFP using an ASIC to replace the FPGA and other circuitry.

FIGS. 24A and 24B illustrated the wireless SFP (WSFP) Device 100 using an Application Specific Integrated Circuit (ASIC) as a functional replacement to the FPGA as illustrated in the schematic of FIG. 15 and other circuitry. The ASIC will optimize the FPGA circuity to yield an ASIC with lower material cost, testing cost, and power consumption. FIG. 24A is a schematic diagram of the wireless SFP using an ASIC to replace the FPGA. The Intel® eASIC™ devices are an example of a FPGA conversion to an ASIC device. The ASIC may also have a smaller physical device size to that of the FPGA. The ASIC can also integrate some or all other wireless WSFP Device 100 circuitry. FIG. 24B is a schematic diagram of the ASIC integrating the microprocessor unit (MPU) 42, Wireless SOC 44, Memory 46, and Power Manager 48 of FIG. 24A.

While the embodiment(s) disclosed herein are illustrative of the structure, function and operation of the exemplary method(s), system(s) and device(s), it should be understood that various modifications may be made thereto with departing from the teachings herein. Further, the components of the method(s), system(s) and device(s) disclosed herein can take any suitable form, including any suitable hardware, circuitry or other components capable of adequately performing their respective intended functions, as may be known in the art.

It should be understood that the individual components of the circuitry illustrated in FIGS. 10-13, 15, 24A and 24B could be any commercially available components, respectively. For example, the wireless SoC could be a Broadcom/Cypress BCM4339, a Marvell Avastar 88W8887, a Marvell Avastar 88W8977, or any equivalent or similar SoC suitable to produce the device(s), system(s) and method(s) disclosed herein, and/or achieve the functionality of the device(s), system(s) and method(s) disclosed herein. The FPGA when used could be either a Microsemi SmartFusion2 SoC FPGA, an Intel/Altera Cyclone V FPGA, or any equivalent or similar FPGA suitable to produce the device(s), system(s) and method(s) disclosed herein, and/or achieve the functionality of the device(s), system(s) and method(s) disclosed herein.

While the foregoing discussion presents the teachings in an exemplary fashion with respect to the disclosed method(s), system(s) and device(s) for providing wireless communication services, it will be apparent to those skilled in the art that the present disclosure may apply to other method(s) and system(s) utilizing wireless technologies. Further, while the foregoing has described what are considered to be the best mode and/or other examples, it is understood that various modifications may be made therein and that the subject matter disclosed herein may be implemented in various forms and examples, and that the method(s), system(s) and device(s) may be applied in numerous applications, only some of which have been described herein.

What is claimed is:

1. A small form-factor pluggable (SFP) device comprising:
   a printed circuit board having circuitry; and
   wherein the circuitry provides at least two antenna for transmission and reception of at least two wireless signals via at least two wireless communication channels, and the SFP device plugged into a network interface device is configured to communicate with first network equipment via one of the at least two communication channels and is configured to communicate with second network equipment via another of the at least two communication channels.

2. The device of claim 1, further comprising at least two internal etched antennas on the printed circuit board.

3. The device of claim 1, further comprising at least two Coax or USB antenna connectors attached to the printed circuit board.

4. The device of claim 1, further comprising at least one internal etched antenna on the printed circuit board and at least one Coax or USB antenna connector attached to the printed circuit board.

5. The device of claim 1, wherein the circuitry includes a wireless system on chip (SoC).

6. The device of claim 5, wherein the wireless system on chip (SoC) comprises a processor, a first wireless sub-system, a second wireless sub-system, a host interface, and peripheral modules.

7. The device of claim 1, wherein the circuitry includes power supply circuitry.

8. The device of claim 1, wherein the circuitry includes at least one of provisioning circuitry, monitoring circuitry and testing circuitry.

9. The device of claim 1, wherein the circuitry includes a microprocessor, a memory, and clock and timing circuitry.

10. The device of claim 1, wherein the circuitry includes an Application Specific Integrated Circuit (ASIC).

11. The device of claim 10, wherein the ASIC integrates a microprocessor unit (MPU), a Wireless SOC, a Memory, and a Power Manager.

12. A wireless telecommunication system comprising:
    a network interface device having at least one SFP port;
    at least one wireless small form-factor pluggable (SFP) device plugged into the at least one SFP port,
    wherein the at least one wireless SFP device includes wireless circuitry and at least two associated antenna for transmission and reception of at least two wireless signals via at least two wireless communication channels;
    first communication equipment in wireless communication with the at least one wireless SFP device via one of the at least two wireless communication channels; and
    second communication equipment in wireless communication with the at least one wireless SFP device via another of the at least two wireless communication channels.

13. The system of claim 12, wherein the at least one wireless SFP device includes circuitry for configuring, monitoring, provisioning, or testing the second communication equipment.

14. The system of claim 12, wherein the at least one wireless SFP device is configured to provide a wireless signal demarcation between communication networks and/or communication services.

15. The system of claim 12, wherein the at least one wireless SFP device is configured to provide a wireless bridge/repeater for communication networks and/or communication services.

16. The system of claim 12, wherein the at least one wireless SFP device is configured to provide a wireless access point or station for communication networks and/or communication services.

17. A method for wireless telecommunication, comprising the steps of:
    providing wireless circuitry on a small form-factor pluggable (SFP) device;
    wherein the SFP device includes at least two antenna for the wireless circuitry for transmission and reception of at least two wireless signals via at least a first wireless communication channel and a second wireless communication channel;
    plugging the SFP device into a network interface device; and
    communicating with first network equipment via the first wireless communication channel, and communicating with second network equipment via the second communication channel.

18. The method of claim 17, further comprising the step of configuring, monitoring, provisioning, and testing the second network equipment via the SFP device.

19. The method of claim 17, further comprising the step of providing a wireless signal demarcation between the first network equipment and the second network equipment via the SPF device.

20. The method of claim 17, further comprising the step of providing a wireless bridge/repeater for communication networks and/or communication services via the SFP device.

21. The method of claim 17, further comprising the step of providing a wireless access point or station for communication networks and/or communication services via the SFP device.

* * * * *